(12) United States Patent
Chang et al.

(10) Patent No.: US 10,148,304 B2
(45) Date of Patent: Dec. 4, 2018

(54) BROADBAND INTELLIGENT ANTENNA SYSTEM (BIAS)

(71) Applicant: Dell Products L. P., Round Rock, TX (US)

(72) Inventors: Ching Wei Chang, Austin, TX (US); Youngsoo Cho, Cedar Park, TX (US); Jace W. Files, Round Rock, TX (US); Gerald R. Pelissier, Mendham, NJ (US); Ricardo R. Valasco, Cumming, GA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/581,943

(22) Filed: Apr. 28, 2017

(65) Prior Publication Data

US 2018/0316379 A1    Nov. 1, 2018

(51) Int. Cl.
| | |
|---|---|
| *H04M 1/00* | (2006.01) |
| *H04B 1/3827* | (2015.01) |
| *H04B 1/401* | (2015.01) |
| *H04W 52/28* | (2009.01) |
| *H01Q 1/24* | (2006.01) |
| *H04W 4/02* | (2018.01) |
| *H04W 4/80* | (2018.01) |
| *H04W 88/06* | (2009.01) |

(52) U.S. Cl.
CPC ........... *H04B 1/3838* (2013.01); *H01Q 1/245* (2013.01); *H04B 1/401* (2013.01); *H04W 4/026* (2013.01); *H04W 4/80* (2018.02); *H04W 52/283* (2013.01); *H04W 88/06* (2013.01)

(58) Field of Classification Search
CPC ....... H04B 1/3838; H04B 1/401; H04W 4/80; H04W 4/026; H04W 52/283; H04W 88/06; H01Q 1/245
USPC ...................................................... 455/552.1
See application file for complete search history.

(56) References Cited

U.S. PATENT DOCUMENTS

2007/0066233 A1*   3/2007   Smith ................. H01Q 1/1257
                                                                          455/67.11

* cited by examiner

*Primary Examiner* — Eugene Yun
(74) *Attorney, Agent, or Firm* — Campbell Stephenson LLP; Shiv S. Naimpally

(57) ABSTRACT

A computing device with a Broadband Intelligent Antenna System (BIAS) that supports a broadband antenna design within the device. Each broadband antenna operates over a plurality of Radio Frequency (RF) bands to cover multiple different wireless technologies with a single antenna. The BIAS may continually monitor multiple triggers capable of affecting the signal quality of the wideband antennas and may automatically switch the active antennas accordingly to select an operating configuration that provides a higher signal quality of the active antennas. Triggers may be generated when, for example, one or more antennas are being blocked by a user, there is a change in the orientation of the device, a source of electrical noise is detected, unacceptable Specific Absorption Rate (SAR) proximity is detected, and so on. The trigger-based adaptive switching from one active antenna to the other may substantially improve the overall signal quality for the multiple wireless technologies supported by the device.

20 Claims, 10 Drawing Sheets

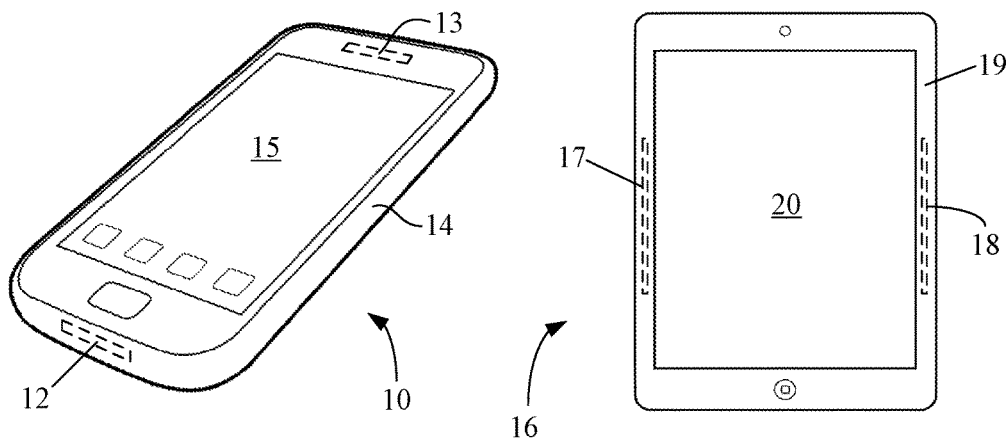
FIG. 1A
FIG. 1B
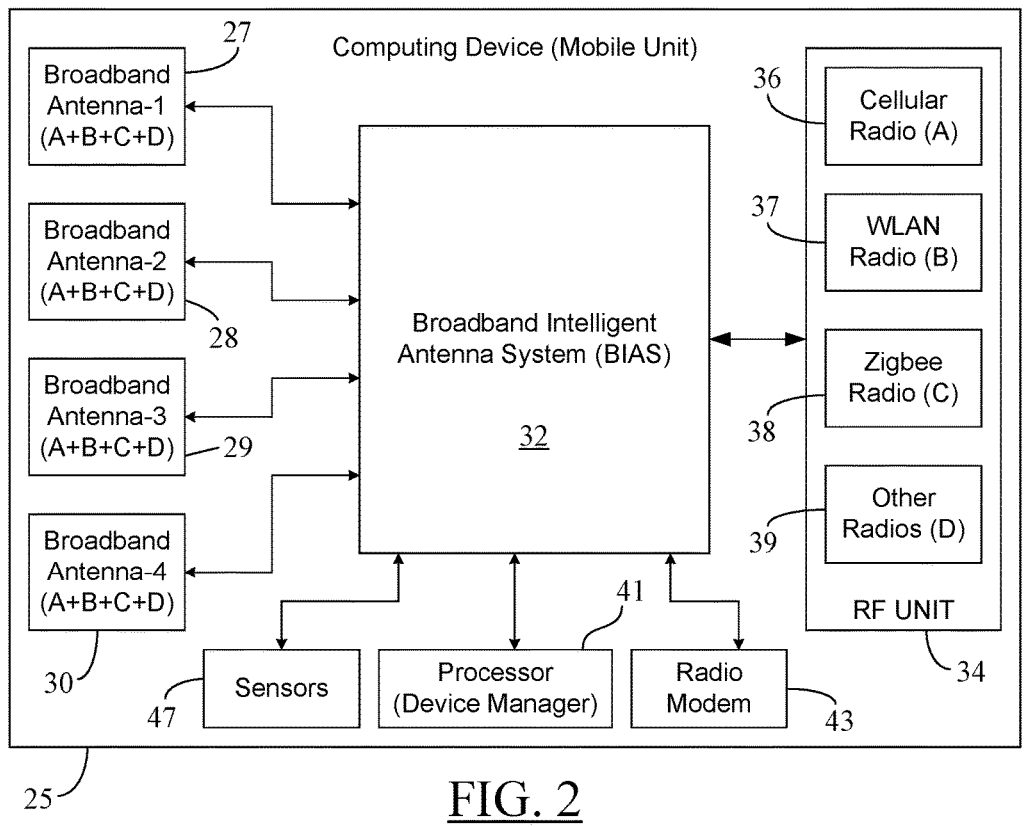
FIG. 2

| Radio Technology | Idle | LTE only | | WLAN only | | Co-Existence (LTE and WLAN) |
|---|---|---|---|---|---|---|
| LTE-1 (Main) | Idle | Traffic | Traffic | Idle | Off | Traffic |
| LTE-2 (Aux) | Idle | Traffic | Traffic | Idle | Off | Traffic |
| WLAN-1 (Main) | Idle | Idle | Off | Traffic | Traffic | Traffic |
| WLAN-2 (Aux) | Idle | Idle | Off | Traffic | Traffic | Traffic |

90 ⟶

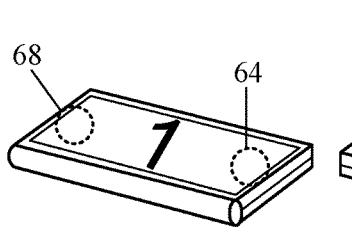
FIG. 13A
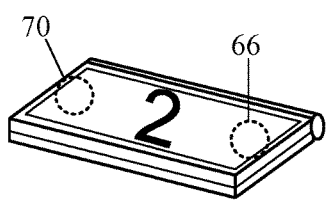
FIG. 13B
Tablet Orientation
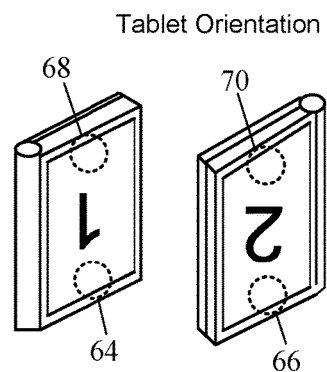
FIG. 13C  FIG. 13D
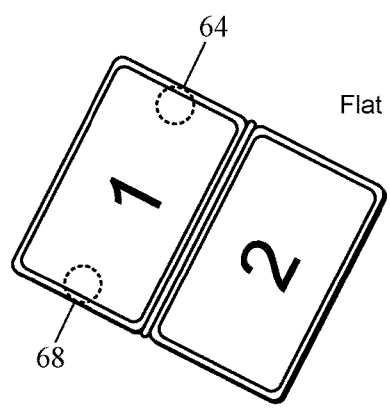
FIG. 14A
Flat Orientation
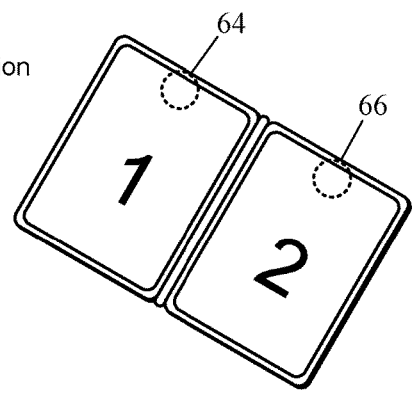
FIG. 14B

| Device Orientation | Figure | ANT1 | ANT2 | ANT3 | ANT4 | Sensors/Status used to determine orientation |
|---|---|---|---|---|---|---|
| Book | 9A | X | X | O | O | SAR Prox + Accel + Hinge Angle |
| Book | 9B | O | O | X | X | SAR Prox + Accel + Hinge Angle |
| Book | 9C | X | O | X | O | SAR Prox + Accel |
| Book | 9D | O | X | O | X | SAR Prox + Accel |
| Clamshell | 10A | X | O | O | O | SAR Prox + Accel |
| Clamshell | 10B | O | X | X | X | SAR Prox + Accel |
| Closed | 11A | X | O | X | O | SAR Prox + Accel + Hinge Angle + Display Status |
| Closed | 11B | O | X | O | X | SAR Prox + Accel + Hinge Angle + Display Status |
| Tent | 12A | O | X | O | X | SAR Prox + Accel + Display Status |
| Tent | 12B | X | O | X | O | SAR Prox + Accel + Display Status |
| Tent | 12C | X | O | X | O | SAR Prox + Accel + Display Status |
| Tent | 12D | O | X | O | X | SAR Prox + Accel + Display Status |
| Tablet | 13A | X | O | X | O | SAR Prox + Accel + Display Status |
| Tablet | 13B | O | X | O | X | SAR Prox + Accel + Display Status |
| Tablet | 13C | O | O | O | X | SAR Prox + Accel + Hinge Angle + Display Status |
| Tablet | 13D | X | O | X | O | SAR Prox + Accel + Hinge Angle + Display Status |
| Flat | 14A | X | O | X | O | SAR Prox + Accel + Display Status |
| Flat | 14B | X | X | O | O | SAR Prox + Accel + Display Status |

176

X = Optimized Antenna Selection
O = Secondary Configuration

FIG. 16

BROADBAND INTELLIGENT ANTENNA SYSTEM (BIAS)

TECHNICAL FIELD

This disclosure relates generally to antenna systems for consumer devices and, more particularly, to a Broadband Intelligent Antenna System (BIAS) that continually monitors multiple triggers capable of affecting the signal quality of a plurality of wideband antennas in a consumer device and automatically switches the active antennas accordingly to select an operating configuration that provides a higher signal quality of the active antennas.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as portable computing devices, may include, for example, tablet computers, laptops, smartphones, User Equipments (UEs), cellular telephones or data transfer equipments, and the like. In addition to supporting data processing and computing functionalities, these devices also offer wireless communication capabilities for voice, picture, video, and/or other data communication. The same device may support more than one type of technology for wireless communication. For example, the device may support a Wireless Fidelity (Wi-Fi®) connection, a Bluetooth® connection, and a cellular network connection such as talk, text, and data communication over a cellular Long Term Evolution (LTE) network. The user may select one of these connections for wireless communication or may keep more than one connection/technology active simultaneously for different communication needs.

To support different wireless technologies requiring wireless communication over different RF bands, current consumer devices include two or more technology-specific RF antennas embedded at different locations inside the device. When an antenna in a consumer device (e.g., laptop, tablet, cell phone, or the like) transmits power, a portion of the power may be absorbed when a body part (finger, hand, or the like) is near the antenna. For example, when a user holds a portable consumer device (e.g., phone or tablet), the user may grasp the device using one hand or both hands. If a portion of one or both hands are above one or more antennas that are located inside the case of the device, then the hands may absorb a portion of the power transmitted by the antennas. The amount of power absorbed by a body part is referred to as Specific Absorption Rate (SAR). SAR reduces the maximum power that a device can transmit from its antennas when a hand or other body part is near the antenna. Reducing the maximum output power that the antenna can transmit may affect wireless connectivity by causing slow transmission speeds, dropped packets, and other connectivity issues. Thus, SAR may result in a user having a negative online experience.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques are described herein for a Broadband Intelligent Antenna System (BIAS) that supports a single wideband antenna design within the device and provides pertinent operational hardware and software. Thus, each antenna in a consumer device as per particular embodiments of the present disclosure may be a broadband antenna operable to wirelessly transmit and receive over a plurality of RF ranges to cover multiple different technology-specific RF bands (or wireless modes) using a single antenna. A single broadband antenna may replace two or more discrete, technology-specific antennas needed in the existing consumer devices, thereby substantially saving the device real estate needed for wireless support. In particular embodiments, the BIAS may continually monitor multiple triggers capable of affecting the signal quality of a plurality of wideband antennas in the consumer device and may automatically switch the active antennas accordingly to select an operating configuration with a higher signal quality of the active antennas. Although a user still manually (for example, through a User Interface (UI) on a display screen of the user's device) may select one or more supported technologies (Wi-Fi, Bluetooth®, LTE, and so on) to be activated for user's wireless needs, the user no longer may need to manually operate a button/switch to connect any antenna radiator for the desired wireless configuration. The BIAS module may automatically perform necessary switching among the active antennas, as well as the routine frequency band switching for a specific (active) antenna. The trigger-based intelligent switching from one active antenna to the other may substantially improve the overall signal quality for the multiple wireless technologies supported by the device.

As discussed in more detail later, the triggers may include, for example, a change in orientation of the computing device, extent of proximity of a human or non-human object to the computing device, detection of a source of electrical noise, operational status of each display unit in a plurality of display units comprised in the computing device, proximity of a human that is unacceptable under a wireless mode-specific Specific Absorption Rate (SAR) requirement, a change in a SAR-based pre-defined location of the computing device, and an Over-The-Air (OTA) signal for the wireless mode of operation.

In one embodiment, the present disclosure is directed to a method, which comprises: (i) detecting, by a computing device, a wireless mode of operation of the computing device; (ii) based on the detected wireless mode, determining, by the computing device, an antenna-specific operating configuration for each of a plurality of antennas in the computing device, wherein each antenna is a broadband antenna operable to wirelessly transmit and receive over a plurality of Radio Frequency (RF) ranges; (iii) for each of the plurality of antennas, monitoring, by the computing device, a plurality of triggers capable of affecting signal quality of the antenna in the antenna-specific operating configuration; and (iv) based on the plurality of triggers, selecting, by the computing device, an operating configuration of at least one of the plurality of antennas.

In another embodiment, the present disclosure is directed to a computing device, which comprises: (i) a memory for storing program instructions; (ii) a plurality of antennas, wherein each antenna of the plurality of antennas comprises a broadband antenna to wirelessly transmit and receive over a plurality of RF ranges; (iii) a plurality of sensors, wherein each sensor of the plurality of sensors is configured to generate a sensor-specific output; (iv) and a processor coupled to the memory, the plurality of sensors, and the plurality of antennas. In the computing device, the processor executes the program instructions to: (a) detect a wireless mode of operation of the computing device; (b) based on the wireless mode, determine an antenna-specific operating configuration of each antenna of the plurality of antennas in the computing device; (c) for each antenna of the plurality of antennas, monitor one or more sensor-specific outputs to determine a plurality of triggers capable of affecting signal quality of the antenna in the antenna-specific operating configuration; and (d) based on the plurality of triggers, select an operating configuration of at least one of the plurality of antennas.

In a further embodiment, the present disclosure is directed to a computer program product comprising a non-transitory computer-usable medium having computer-readable program code embodied therein. In the computer program product, the computer-readable program code is executable by a computing device to perform operations comprising: (i) detecting a wireless mode of operation of the computing device; (ii) based on the wireless mode, establish an antenna-specific operating configuration for each of a plurality of antennas in the computing device, wherein each antenna is a broadband antenna operable to wirelessly transmit and receive over a plurality of RF ranges; (iii) for each of the plurality of antennas, monitoring a plurality of triggers capable of affecting signal quality of the antenna in the antenna-specific operating configuration; and (iv) based on the plurality of triggers, selecting an operating configuration of at least one of the plurality of antennas.

During normal usage, it is typically difficult to design for all user behaviors and concurrent operations (of different wireless modes). Typically, in many instances, the antennas may be blocked by the user. In conventional antenna systems, when the antennas are so blocked, the device would seem to have poor wireless performance. However, in a BIAS-based consumer device, the usage of multiple broadband antennas along with the BIAS module's adaptive switching of the antennas may provide the best possible wireless performance for the consumer device without being limited to a specific wireless mode (Wi-Fi®, LTE, and the like) or to a specific concurrent mode (WiFi+LTE, LTE+Bluetooth®, and so on). In particular embodiments, BIAS effectively "creates" a single antenna for the device through its seamless and transparent switching from one antenna configuration to the other based on a number of triggers.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

FIGS. 1A-1B illustrate examples of current antenna placements for a smartphone and a tablet, respectively.

FIG. 2 is a block diagram of a portion of a computing device that includes multiple broadband antennas and a BIAS module according to some embodiments.

FIGS. 9A, 9B, 9C, 9D, 10A, 10B, 11A, 11B, 12A, 12B, 12C, 12D, 13A, 13B, 13C, 13D, 14A, and 14B illustrate different orientations of a dual-display device and the antennas thereof that may be selected by a BIAS module as "main" antennas for increased signal quality based on an analysis of a number of triggers as per particular embodiments of the present disclosure.

FIG. 16 is an exemplary chart/table illustrating which antennas may be selected as "main" and "auxiliary" antennas by a BIAS module depending on the device orientation in the embodiments of FIGS. 9-14.

DETAILED DESCRIPTION

Figure 3:
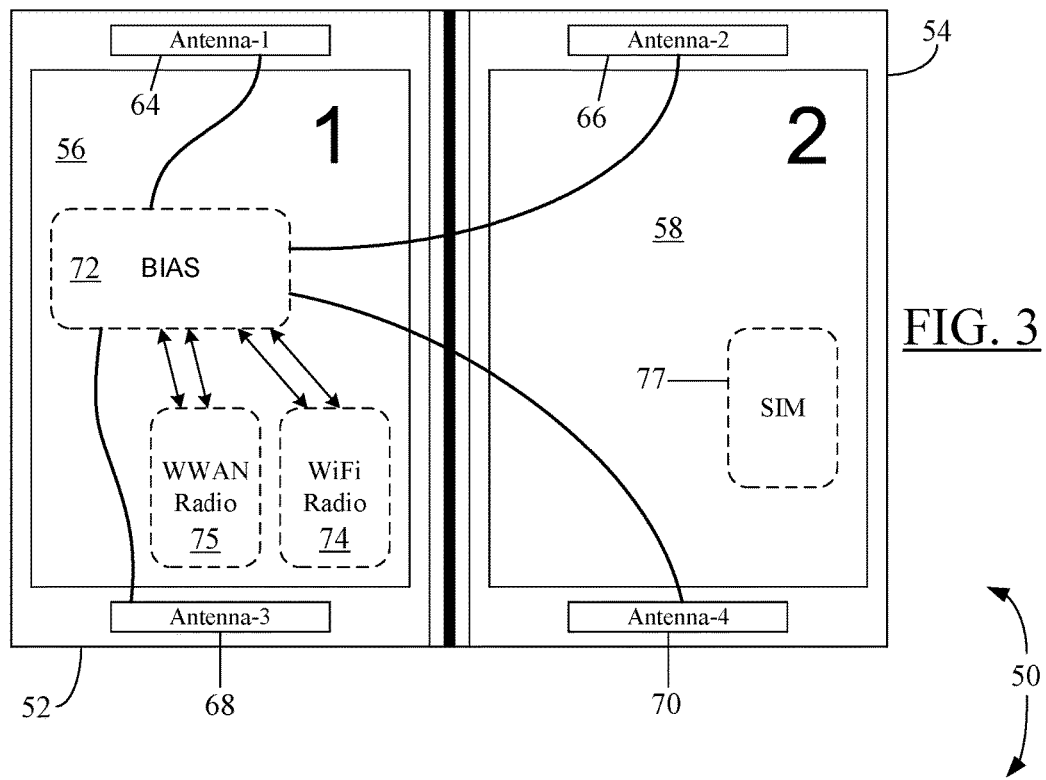
FIG. 3 illustrates a computing device that is an example of the computing device shown in FIG. 2 according to particular embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or video display. The information handling system may also include one or more buses operable to transmit communications between the various hardware components.

As used herein, the terms "consumer device," "computing device," or "mobile unit" may be used interchangeably to refer to a portable computing unit with wireless communication capability. Such unit may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for personal, business, scientific, control, or other purposes. For example, as mentioned before, a consumer device or mobile unit may be a personal computer (e.g., a laptop), tablet computer, mobile device (e.g., personal digital assistant (PDA) or smart phone), a UE, or any other suitable device and may vary in size, shape, performance, functionality, and price.

It is noted here that, for ease of discussion, a unit or module may be referred to as "performing," "accomplishing," or "carrying out" a function or process. The unit may be implemented in hardware and/or software. However, it is evident to one skilled in the art that such performance may be technically accomplished by a processor when appropriate software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "antenna-specific", "computer-readable", "Wi-Fi", etc.) may be occasionally interchangeably used with its non-hyphenated version (e.g., "antenna specific," "computer readable", "WiFi", etc.), and a capitalized entry (e.g., "Broadband Antenna", "Sensor Hub", "WiFi", etc.) may be interchangeably used with its non-capitalized version (e.g., "broadband antenna", "sensor hub", "wifi", etc.). Such occasional interchangeable uses shall not be considered inconsistent with each other.

Wireless technologies such as WiFi®, BlueTooth®, code division multiple access (CDMA®), Global System for Mobile (GSM®), and other wireless technologies support communication over a corresponding pre-assigned Radio Frequency (RF) band. For example, the Wi-Fi® technology is based on the Institute of Electrical and Electronics Engineers (IEEE) 802.11 standard and may commonly use frequencies in the 2.4 GHz and 5 GHz RF bands. On the other hand, a Bluetooth® connection may operate over a 2.4 to 2.485 GHz band, whereas the IEEE 802.15.4 based ZigBee® connection may operate in one of the following Industrial Scientific and Medical (ISM) radio bands: 2.4 GHz in most jurisdictions worldwide; 784 MHz in China, 868 MHz in Europe, and 915 MHz in the USA and Australia. The LTE standard covers a range of many different frequency bands. For example, in North America, an LTE network may use on one or more of the following frequency bands: 700 MHz, 750 MHz, 800 MHz, 850 MHz, 1900 MHz, 1700/2100 MHz, 2300 MHz, 2500 MHz, and 2600 MHz. On the other hand, 2500 MHz band is assigned for LTE communication in South America, whereas 800 MHz, 1800 MHz and 2600 MHz bands are used for LTE in Asia.

To support different wireless technologies requiring wireless communication over different RF bands, consumer devices may include two or more technology-specific RF antennas embedded at different locations inside the device.

FIGS. 1A-1B illustrate examples of antenna placements for a smartphone 10 and a tablet 16, respectively. It is noted here that the antenna placement in FIGS. 1A-1B is for illustration only; actual antenna size and antenna placement may vary from manufacturer to manufacturer and from product to product. Similarly, the smartphone 10 and the tablet 16 are used merely as two examples of modern consumer devices. The discussion of FIGS. 1A-1B equally applies to other consumer devices as well.

In case of the smartphone 10, two antennas 12-13 are shown dotted because of their placement inside the phone 10 at a top and a bottom location along the bezel 14 of the phone 10. The antennas 12-13 may be technology-specific in the sense that the antenna 12 may be specifically designed to cover the Wi-Fi and Bluetooth® bands, whereas the antenna 13 may be specifically designed to cover the LTE bands. The antennas 12-13 may be placed at any other locations within the phone 10 as well. For example, one antenna (not shown) may be placed horizontally at the top behind the display screen 15 of the phone 10 whereas another antenna (not shown) may be placed horizontally at the bottom behind the display screen 15. Similarly, in case of the tablet 16, two antennas 17-18 (shown dotted) may be placed inside the tablet 16 at a top and a bottom location along the bezel 19 of the tablet 16. The antennas 17-18 also may be technology-specific in the sense that the antenna 17 may be specifically designed to cover the Wi-Fi and Bluetooth® bands, whereas the antenna 18 may be specifically designed to cover the LTE bands. The antennas 17-18 may be placed at any other locations within the phone 10 as well. For example, at least one of the antennas may be placed behind the display screen 20 of the phone 10. More than two antennas may be present in some smartphones and tablets as well, each antenna configured to cover a single, dedicated frequency band.

Thus, antenna system designs for consumer devices are custom designs and on a per-platform basis. The antennas are designed and placed specifically to meet the needs of a particular platform, such as the device type (tablet, phone, or the like), device geometry/shape, device structure, and wireless communication features (or protocol support) offered. Furthermore, the antennas may operate at specific target frequencies. For example, as discussed above, an antenna may be dedicated for Wi-Fi communication and may be unable to perform communication over LTE bands. Similarly, another antenna may be specifically configured to support LTE communication, and may not cover the Wi-Fi and Bluetooth® bands. Because of such target frequency-related restrictions, current antenna systems for a platform that requires support for a number of different wireless technologies/frequency bands would occupy substantial real estate (or physical space) within the device to accommodate all different technology-specific antennas.

Furthermore, traditionally, a consumer device supporting multiple wireless technologies such as, for example, Wi-Fi and LTE frequencies, may have a clickable or sliding button/switch (in hardware or software) requiring a user to manually operate the button to connect the antenna radiator between the associated Wi-Fi and LTE antenna modules for operational usage. In addition, current technology-specific antenna solutions use switching techniques or algorithms for frequency band switching on a single antenna or beam-forming techniques to enable the antenna to support the frequency bands of the associated technology. For example, a dedicated Wi-Fi antenna may need frequency band switching to support operations over different Wi-Fi frequencies in the 2.4 GHz and 5 GHz RF bands. However, such frequency switching does not re-configure the antenna to support LTE bands as well.

The systems and techniques described herein provide an intelligent and automated antenna solution for consumer devices that covers different technology-specific RF bands with a reduced number of antennas than is currently being offered and that does not sacrifice the precious real estate within the device. The systems and techniques described herein may adapt to user behavior—such as, for example, user-initiated changes to device orientation—as well as to multiple triggers capable of affecting the signal quality of an antenna.

FIG. 2 is a block diagram of a portion of a computing device 25 that includes multiple broadband antennas 27-30 and a Broadband Intelligent Antenna System (BIAS) module 32 according to some embodiments. It is noted at the outset that a single module 32 is shown for ease of illustration only; the BIAS functionality may be implemented in a distributed manner as well through multiple discrete modules. The components shown in FIG. 2 may be encased within a housing of the computing device 25 and, for ease of discussion, the reference numeral "25" also may refer to such housing. In particular embodiments, such as the embodiments shown in FIGS. 3-4 and 9-14 discussed below, the computing device 25 may include two housings coupled to each other via one or more hinges. The hinges may enable the two housings to be positioned at different angles relative to each other in different orientations (e.g., vertical orientations and horizontal orientations). Of course, additional housings may be attached via additional hinges to create a computing device with multiple housings.

In the embodiment of FIG. 2, each wideband (or broadband) antenna 27-30 may cover an RF frequency range from approximately 700 MHz to up to 6 GHz. For example, in one embodiment, each antenna 27-30 may be a single feed RF cable antenna covering the following RF bands: approximately 698 MHz to 960 MHz, approximately 1.4 GHz to 1.6 GHz, approximately 1.7 GHz to 2.7 GHz, and approximately 5 GHz to 6 GHz. Thus each antenna 27-30 may be configured, as needed, by the BIAS module 32 to support wireless communication over any of a number of different wireless modes (or protocols)—such as, for example, WiFi®, LTE (or any other cellular technology like Code Division Multiple Access (CDMA) or Global System for Mobile Communications (GSM)), Bluetooth®, Zigbee®, and so on. For example, each antenna 27-30 can be both a Wi-Fi antenna as well as an LTE antenna, and its current operating configuration may be selected by BIAS 32 as discussed in more detail later below. This is in contrast to the existing antenna configurations shown in FIGS. 1A-1B where each antenna may be technology-specific and, hence, may not be able to be operated to cover additional RF bands associated with other wireless technologies. In some embodiments, two or more of the wideband antennas 27-30 may be operable in a Multiple-Input Multiple-Output (MIMO) configuration.

An RF unit 34 is shown to be in communication with the BIAS module 32 and having a number of technology (or protocol) specific component units 36-39 operable to process the signals to be transmitted from or already received by any of the wideband antennas 27-30 with a specific protocol frequency range and format. For example, the component unit 36 may process cellular radio signals associated with LTE or non-LTE cellular technologies, the component unit 37 may process WiFi and related WLAN communication, the component unit 38 may process radio signals for Zigbee® protocol, and the component unit 39 (or any additional component units) may process other types of radio signals—such as, for example, Bluetooth signals, Near Field Communication (NFC) signals, Machine-to-Machine (M2M) communication signals, or RF signals associated with current or future short-range or long-range wireless modes not specifically mentioned here. Thus, the broadband antenna configuration in the embodiment of FIG. 2 may enable the computing device 25 to have wireless support ready for the LTE-Unlicensed (LTE-U) or LTE-License Assisted Access (LTE-LAA) modes, which utilize the unlicensed RF spectrum typically in the 5 GHz band to provide additional radio spectrum. Depending on the requirements of a new wireless protocol, the device 25 may be configured, for example, through a protocol-specific software download/update, to provide support for the additional/future wireless mode.

Figures 6, 8:
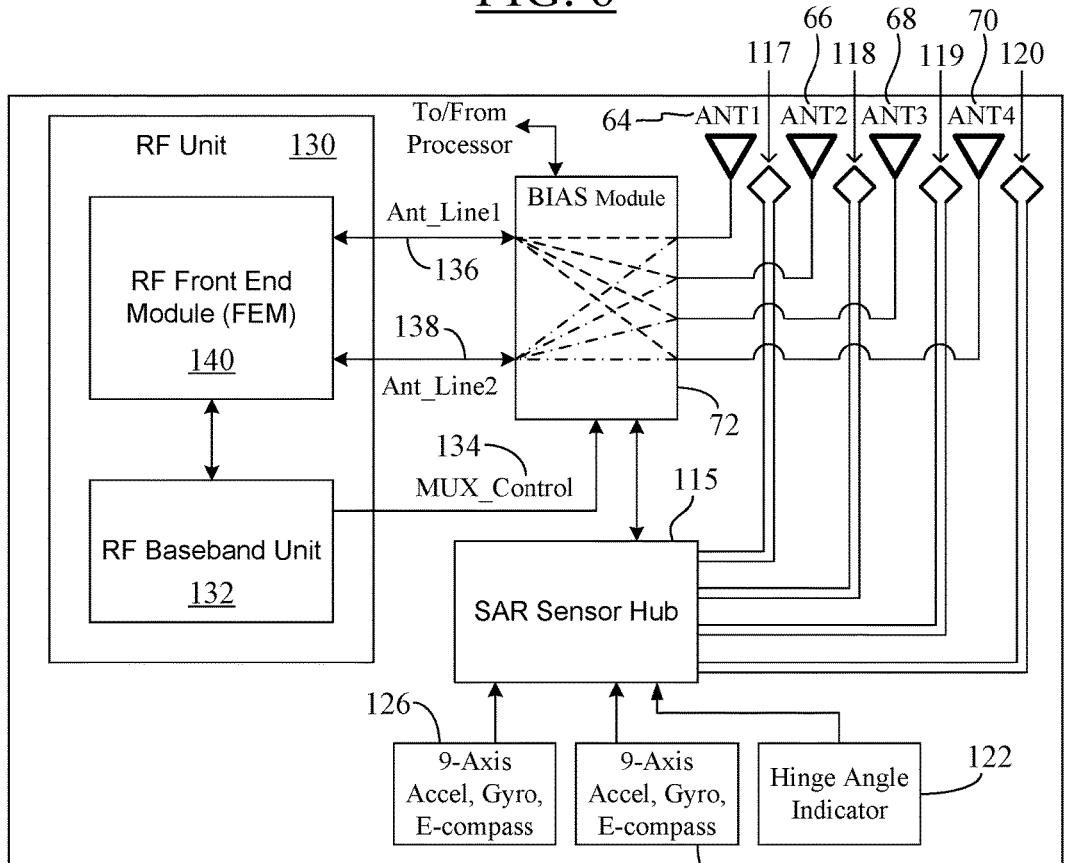
FIG. 6 is an exemplary table showing different operating configurations of the four broadband antennas illustrated in the embodiments of FIGS. 3-4 to be selected by a BIAS module as per particular embodiments of the present disclosure.
FIG. 8 is a partial block diagram of the computing device shown in FIGS. 3-4 according to some embodiments.

In particular embodiments, an RF unit, such as the RF unit 34, may include an RF baseband unit (not shown in FIG. 2, but shown in FIG. 8) that incorporates the functionalities of the components units, like the units 36-39. The RF unit also may include additional circuit elements, such as an RF Front End Module (RFFEM) as shown in FIG. 8 and discussed later. In some embodiments, the RFFEM may incorporate the functionality of a radio modem, like the radio modem 43 discussed below. The letters "A", "B", "C", and "D" at blocks 36-39, respectively, in the RF unit 34 in FIG. 2 are used merely to indicate that each block processes signals associated with a different type of wireless technology/protocol. However, all four of these letters ("A+B+C+D") are mentioned at each of the blocks 27-30 to indicate that each broadband antenna 27-30 is capable of transmitting/receiving RF signals over a wide range of frequencies covering all of the wireless technologies supported by the device 25.

Briefly, during transmission, protocol-specific pre-processing of content to be wirelessly transmitted may be performed by appropriate component unit 36-39 selected by the BIAS module 32 under operative control of a processor (or device manager) 41 in the device 25. In particular embodiments, either the processor 41 or the BIAS module 32 may be configured to detect the wireless mode of operation of the device 25 based on, for example, one or more user inputs received by the device 25 as discussed below. Thereafter, the content may be processed by a radio modem 43 and sent to one of the broadband antennas 27-30 via an RF crossbar unit or crossbar switch (not shown) under operative control of the BIAS module 32. In particular embodiments, the BIAS module 32 may include the RF crossbar unit/switch or other RF crossbar functionality to be able to select the appropriate antenna from among the available antennas 27-30 for transmission of the content. During wireless reception, appropriate broadband antenna 27-30 may be initially selected by the BIAS module 32 and the signals received from the selected antenna may be first processed by the radio modem 43 followed by protocol-specific processing by the RF unit 34. The de-modulated and detected content may be then processed by the device manager 41 as instructed by the device's 25 operating system (not shown) and any other application software (not shown) under execution by the processor 41.

As discussed in more detail below, in particular embodiments, the BIAS module's 32 selection of an antenna (or switching from one antenna to the other) for transmission/reception under a specific wireless mode may be based on a plurality of triggers received from a sensor unit 47, which may contain a number of sensors placed throughout different locations within the computing device 25. The sensed signals or data from the sensors may be received by the sensor unit 47 and shared with the BIAS module 32 for further processing under operative control of the device manager 41. Some exemplary sensors include proximity detection sensors that detect proximity of a human hand/body or a non-human object (such as metallic material) to the computing device 25, device orientation detection sensors including one or more accelerometers and/or gyroscopes, electrical noise detection sensors, device hinge angle detection sensors (for example, when the computing device 25 is formed of two or more parts hinged together as in case of the embodiments in FIGS. 3-4), and the like.

It is noted here that, in particular embodiments, a user of the device 25 may be given an option, such as, for example, via a user interface on a display screen of the device 25, to input the user's selection of the wireless mode(s) of operation. As a result, the user may select any one or a combination of the previously mentioned wireless modes such as, for example, WiFi, Bluetooth, LTE, LTE-AAA, and so on. In one embodiment, the processor 41 may process the user input to identify (or detect) which one or more of the wireless communication modes the user has selected to be supported by the device 25. The processor 41 also may provide the information about the user-selected wireless mode(s) to the BIAS module 32 for appropriate antenna selection and switching to provide wireless communication support to the user.

In the architecture shown in FIG. 2, four broadband antennas 27-30 are depicted by way of an example only. Similarly, the embodiments in FIGS. 3-4 and 8-14 relate to a four antenna-based consumer device for the sake of illustration of various BIAS functionalities. In particular embodiments, a mobile unit may be equipped with two such broadband antennas. In other embodiments, a mobile unit may have more than four such broadband antennas. Generally, it is preferable to have a minimum of two broadband antennas to support both WiFi and LTE/cellular communication simultaneously. As discussed later, in case of a device with four broadband antennas, one antenna may function as a "main" antenna for a particular wireless mode—for example, a WiFi based Wireless Local Area Network (WLAN) mode—whereas a second antenna may be configured by the BIAS module 32 to function as an "auxiliary" (AUX) antenna for that wireless mode. The auxiliary (second) antenna thus may function as a "backup" antenna to which the ongoing communication may be switched by the BIAS module 32 if BIAS's 32 processing of various triggers indicates that switching the auxiliary (second) antenna to now function as the "main" antenna may provide an operating configuration for the auxiliary antenna to maintain the quality of wireless signaling. In that case, the operating configuration of the first antenna (which was originally-selected as the "main" antenna) may be now switched from the "main" status to the "auxiliary" status.

In some embodiments, the BIAS module 32 may be implemented as a combination of hardware (like logic gates, switches, and so on) and software (like microcode or a set of program instructions). In other embodiments, the BIAS functionality may be implemented entirely in software. The processor 41 also may be implemented as a combination of hardware and software. In certain embodiments, the BIAS module 32 may be a part of the processor unit 41 and, hence, may not be a separate entity as shown in FIG. 2. Regardless of the nature of implementation of BIAS, it is observed here that BIAS software/microcode, when executed by the processor 41 along with other relevant program code (such as, for example, the program code for the operating system of the computing device 25), may cause the computing device 25 to perform the tasks shown in the flowcharts of FIGS. 5, 7, and 15, as well as other BIAS-related tasks discussed herein. Such tasks may include, for example, initially selecting active (or main) and non-active (or auxiliary) antennas for the user-selected wireless mode(s), evaluating the sensor and non-sensor triggers, automatically switching the antennas based on the triggers, and the like. Although not shown in FIG. 2, but as discussed later in more detail with reference to FIG. 17, a mobile unit or consumer device as per particular embodiments of the present disclosure also may include Random Access Memory (RAM), one or more processing resources such as a central processing unit (CPU) or hardware or software control logic, Read-Only Memory (ROM), and/or other types of volatile/non-volatile memory. Additional components of the mobile unit may include one or more disk drives, one or more network ports for communicating with external devices as well as various input and output (I/O) devices, such as a keyboard, a mouse, a touch-screen and/or video display. The mobile unit may also include one or more buses operable to transmit communications between the various hardware components.

Figure 4:
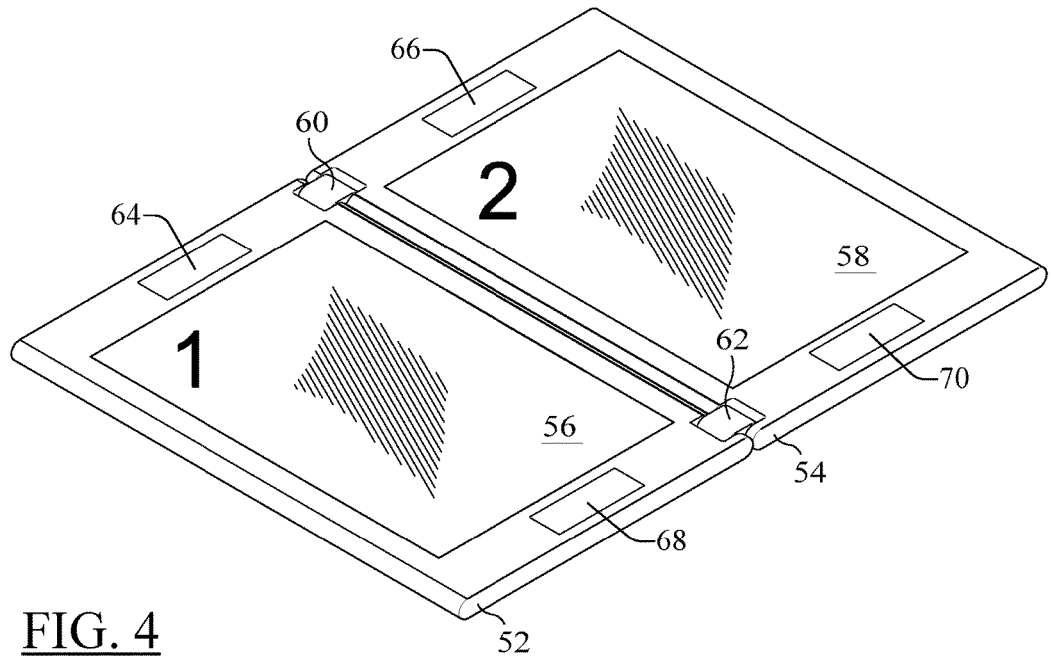
FIG. 4 is a perspective view of the computing device shown in FIG. 3 according to some embodiments.

FIG. 3 illustrates a computing device 50 that is an example of the computing device 25 shown in FIG. 2 according to particular embodiments. FIG. 4 is a perspective view of the computing device 50 shown in FIG. 3 according to some embodiments. The illustrations in FIGS. 3-4 are significantly simplified to show only those details that are relevant to the present disclosure. Thus, for example, audio speakers, camera(s), a power button, one or more slots to connect external memory units such as a Universal Serial Bus (USB) drive or a Secure Digital (SD) or microSD memory card, one or more sockets for audio-video (AV) jacks, and the like, which are typically present in modern consumer devices, are not shown in FIGS. 3-4 for ease of illustration and to avoid depiction of components that not relevant to the present discussion. It is, however, understood that the computing device 50 may include these and other components or features that are typically present in modern consumer devices or mobile units.

Referring now to the simplified top view in FIG. 3 and the simplified perspective view in FIG. 4, it is seen that the computing device 50 may be a dual-display device having a first housing 52 and a second housing 54, each housing containing a corresponding first display screen 56 and a second display screen 58. These display screens are also identified in FIGS. 3-4 using bigger size numbers "1" and "2" written in bold inside the corresponding display. In particular embodiments, the display screens 56, 58 may be touch-sensitive (or touch-screen) displays. It is seen from the perspective view in FIG. 4 that the first housing 52 and the second housing 54 may be coupled together using one or more hinges, two of which are identified in the embodiment of FIG. 4 using reference numerals "60" and "62". The hinges 60, 62 may enable the two housings 52, 54 to be positioned at different angles relative to each other in different orientations (e.g., vertical orientations and horizontal orientations). Of course, additional housings may be attached via additional hinges to create a computing device with multiple housings. Furthermore, in certain embodiments, the computing device 25 may have one display screen.

The computing device 50 in FIGS. 3-4 may implement a 2×2 antenna configuration, which includes a total of four (4) broadband antennas 64, 66, 68, and 70—two antennas per housing. Each antenna in the device 50 may be similar to any of the broadband antennas 27-30 shown in FIG. 2. The placement of antennas in FIGS. 3-4 is just for illustration only. Similarly, for the sake of present discussion, the antennas 64, 66, 68, 70 are shown using rectangles with solid lines, instead of dotted lines to indicate their placement inside the respective housings. In practice, these antennas may not be visible on a consumer device and they may be placed inside the respective housings at locations other than those shown in FIGS. 3-4. In the embodiments of FIGS. 3-4, the antennas are shown in the bezel space surrounding the respective display screens. However, in some embodiments, the display screens 56, 58 may cover substantially the entire lengths of their respective housings, thereby not leaving any meaningful bezel space around the display screens. In particular embodiments, the 2×2 configuration may allow the computing device 50 to support both the Wi-Fi as well as LTE (or other cellular) wireless modes simultaneously by configuring one pair of antennas to support the WiFi mode and the other pair to support the LTE mode. In each pair, one antenna may be configured to function as a "main" antenna whereas the other antenna in the pair may be configured to function as an "auxiliary" antenna as discussed in more detail later.

A first portion of the components of the computing device 50 may be located in the first housing 52 (e.g., behind the first display screen 56) while a remaining portion of the components of the computing device 50 may be located in the second housing 54 (e.g., behind the second display screen 58). For example, as illustrated in FIG. 3, a BIAS module 72 and two components units 74-75 of an RF unit (not shown in FIG. 3) may be located in the first housing 52 whereas a Subscriber Identity Module (SIM) slot 77 may be provided in the second housing 54. It is assumed here that the device 50 is configured to support cellular communication and, hence, is provided with the SIM slot 77 to receive a SIM card from a cellular service provider. the BIAS module 72 may be similar to the BIAS module 32 in FIG. 2 and may be connected to each broadband antenna 64, 66, 68, 70 as shown in FIG. 3. As before, the solid lines showing connection of the BIAS module 72 to various antennas are used simply for illustration; in practice, such connections may be behind the display screens 56, 58 and, hence, may not be visible as solid lines may suggest. One component unit 74 supporting WiFi radio may be similar to the component unit 37 in FIG. 2, whereas the other component unit 75 supporting Wireless Wide Area Network (WWAN) using cellular technologies may be similar to the component unit 36 in FIG. 2.

Some of the device components or elements shown in FIG. 2 are not shown in FIG. 3 for ease of illustration and simplicity of the drawing. It is, however, understood that the consumer device 50 may contain all of the components shown in FIG. 2—as well as additional components not shown in FIG. 2, but relevant for the operation of the device 50—placed within its two housings 52, 54. For example, the computing device 50 may include an RF unit similar to the RF unit 34, a radio modem similar to the modem 43, and a sensor unit similar to the sensor unit 47. Furthermore, although not shown in FIGS. 3-4, other components located in the first housing 52 may include at least one central processing unit (CPU), a graphics process unit (GPU), and a memory (e.g., computer-readable media). The GPU may be integrated into the CPU or may be a separate device from the CPU. In some cases, the computing device 50 may include one or more dedicated digital signal processing (DSP) processors. The CPU and GPU may be connected to one or more input-output (I/O) ports via an I/O bus. The I/O ports may include video ports (e.g., a video graphics adapter (VGA) port, a digital video interface (DVI) port, a high definition media interface (HDMI) port, a ThunderBolt® port, or the like), audio ports (e.g., microphone jack, headphone, jack, and the like), data ports (e.g., universal serial bus (USB) ports compliant with USB 2.0, USB 3.0, and the like), communication ports (e.g., Ethernet and the like), another type of port, or any combination thereof. The GPU may provide two or more lanes of an embedded DisplayPort (eDP) output that are sent to the first display screen 56 in the first housing 52 and two or more lanes of a DisplayPort (DP) output that are sent to the second display screen 58 in the second housing 54.

Other components not mentioned above may be located in the second housing 54. On the other hand, depending on the implementation, different components may be housed in each of the housings 52, 54. For example, when the computing device 50 is designed for graphics processing, the GPU and supporting hardware (e.g., graphics support chips, graphics memory, and the like) may be housed in the second housing 54. As another example, in some cases, the I/O ports may be located in the first housing 52, or in the second housing 54, or split between the two housings 52, 54. Similarly, the hardware constituting the BIAS module 72, an RF unit, a sensor unit, and the like, may be split or replicated between the two housings 52, 54 depending on the design consideration. As a further example, the device 50 may include a battery having multiple power cells, with a portion of the power cells located in the first housing 52 and zero or more of the power cells located in the second housing 54. In some cases, which components of the computing device 50 are located in each of the housings 52, 54 may be determined by the thermal characteristics of the components. For example, the components may be distributed between the housings 52, 54 to enable each of the housings 52, 54 to heat to approximately the same temperature. Doing so may avoid grouping components that generate the most heat into the same housing, thereby causing one housing to be hotter than the other housing.

Figure 5:
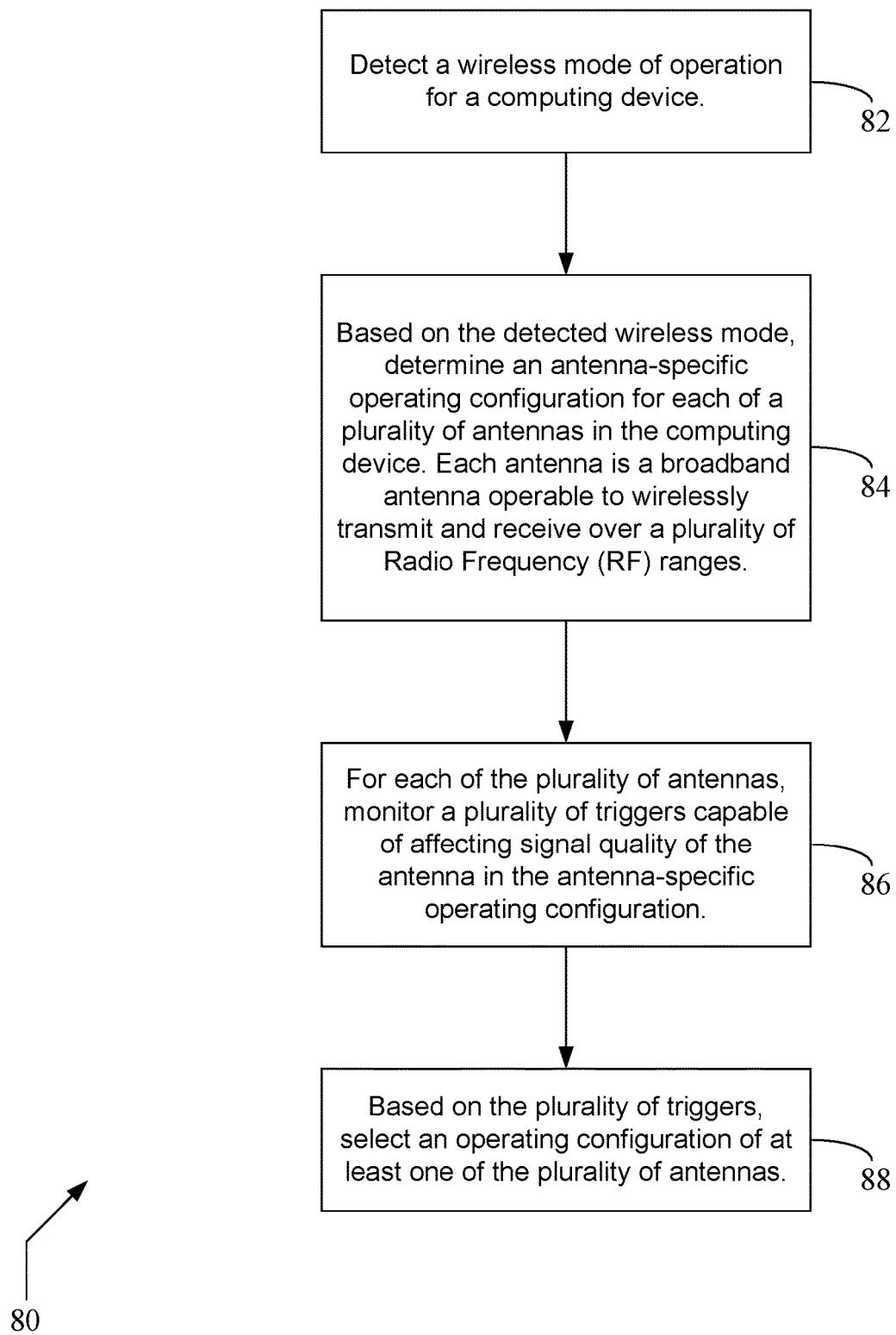
FIG. 5 is an exemplary flowchart of a process to select an operating configuration of an antenna based on triggers according to particular embodiments.

FIG. 5 is an exemplary flowchart 80 of a process to select an operating configuration of an antenna based on triggers according to particular embodiments. The antenna may be any of the antennas 64, 66, 68, 70 in FIGS. 3-4 or the antennas 27-30 in FIG. 2. The process tasks illustrated in FIG. 5 may be performed by a computing device, such as the computing device 25 in FIG. 2 or the computing device 50 in FIGS. 3-4, having a BIAS module—such as the module 32 in FIG. 2 or the module 72 in FIG. 3—as per particular embodiments of the present disclosure. As mentioned before, the program code contained in the BIAS module may be executed by a processor in the computing device to enable the computing device to perform the tasks illustrated in the flowchart 80 of FIG. 5. Thus, initially, at block 82, the computing device may detect the wireless mode of operation (selected by a user) of the computing device. As noted earlier, in particular embodiments, the wireless mode may be detected upon processing mode selection input(s) from the user and may be one or more of a number of different modes supported by the device such as, for example, WiFi, LTE, Bluetooth®, NFC, Zigbee®, and so on. At block 84, based on the detected wireless mode, the computing device may determine or establish an antenna-specific operating configuration for each of the plurality of antennas in the computing device. As mentioned before, each antenna may be a broadband antenna operable to wirelessly transmit and receive over a plurality of RF ranges. An example of the antenna-specific operating configuration is provided in FIG. 7, which is discussed later below. As noted at block 86, for each of the plurality of antennas, the computing device also may monitor a plurality of triggers capable of affecting the signal quality of the antenna in the antenna-specific operating configuration. Different sensor-based and non-sensor triggers are discussed later. Based on the plurality of triggers, the computing device may select an operating configuration (e.g., that enables higher transmission rates than a current operating system) of at least one of the plurality of antennas, as noted at block 88. The BIAS module in the computing device may switch a currently-operational antenna from a primary operating configuration (for example, as a "main" antenna) to a secondary operating configuration (for example, as an AUX antenna) as discussed later with reference to the exemplary antenna selection chart 176 in FIG. 16 as per particular embodiments.

FIG. 6 is an exemplary table 90 showing different operating configurations of the four broadband antennas 64, 66, 68, 70 illustrated in the embodiments of FIGS. 3-4 to be selected by a BIAS module, such as the BIAS module 72 in FIG. 3, as per particular embodiments of the present disclosure. In the illustration in FIG. 6, it is assumed that the computing device 50 is operable to support LTE and WLAN (including WiFi) radio technologies for wireless communication. In the discussion herein, the term "LTE" is used as representative of other cellular technologies (e.g., GSM, CDMA, LTE-AAA, and so on) as well. Similarly, the term "WLAN" can be representative of Wi-Fi and non-wifi short range wireless technologies as well. As before, any of the antennas 64, 66, 68, 70 may be configured for LTE or WLAN communication. A similar table of operating configurations may be prepared as well for other technologies not mentioned in FIG. 6 and/or for devices having more or less than four broadband antennas. The discussion of FIG. 6 is provided in conjunction with FIG. 7, which is an exemplary flowchart 92 of operations of a BIAS module, such as the BIAS module 32 (FIG. 2) or 72 (FIG. 3), according to some embodiments. The block 94 may represent the initial startup or powering-up of the computing device containing the BIAS module. Once the device is turned on, the BIAS module 72 may initially place each broadband antenna—such as the antennas 64, 66, 68, and 70 in FIG. 3—in a pre-defined default operating configuration, as noted at block 96. In certain embodiments, the default configuration also may be invoked in the absence of detection of a wireless mode of operation for the device 50. As is understood, while the device is being turned on, it may not be possible for the device user to select a specific wireless mode of operation. Therefore, in that case, each broadband antenna may be initially placed in the pre-defined default operating configuration until a mode selection input is received from the user. In one embodiment, such pre-defined default configuration may be an "off" mode of operation for an antenna in which the antenna power is turned off so that the antenna may not transmit or receive any signals. In another embodiment, the pre-defined default configuration may be an "idle" mode of operation for an antenna as given by the "idle" column in the table 90 in FIG. 6. In some cases, the "idle" mode may be selected by the BIAS module instead of the "off" mode depending on the orientation of the computing device and location of the primary source of electrical noise. The "idle" mode may maintain an antenna in a low-power state, but without any active transmissions or receptions by the antenna. When needed, an "idle" antenna may be quickly switched to the "traffic" mode (discussed below) to commence transmissions/receptions in a specific radio technology.

Referring again to FIG. 7, at block 98, the BIAS module 72 may determine whether the antenna configurations provide a high transmit/receive rate in the user-selected wireless mode of operation. If the configurations are found to be providing transmit/receive rates that exceed a predetermined threshold, the process in the flowchart 92 remains (or loops back) at the decision block 98. However, after initial startup at block 94, there may be a need to change the antenna configuration from a current configuration to a new configuration with higher throughput after the user selects one or more wireless modes. For example, if the user selects the LTE mode (block 100), then BIAS 72 may initially establish antenna-specific operating configuration for each of the four antennas 64, 66, 68, 70 by internally dividing the antennas into two mutually exclusive subsets—a first subset and a second subset. It is understood that such internal "division" of antennas is not rigidly fixed, but remains adaptive and may be dynamically changed based on triggers. Thus, one or more of the antennas selected for LTE support may be re-configured later for WLAN support, and vice versa. Similarly, an antenna configured as a "main" antenna may be dynamically re-configured as an auxiliary antenna depending on the trigger conditions (as discussed later). Furthermore, the term "division" does not imply any physical separation, but is rather used to indicate that the antennas may get effectively "divided" into two subsets based on their selection to support a specific wireless mode. Thus, the terms like "division" and "subset" are used merely to explain the operational effects of the BIAS module; these terms do not necessarily imply any actual division or ordering of the device antennas.

In some cases, each subset may include two antennas—one from each housing 52, 54. In other cases, each subset may include two antennas—both from the same housing. The antenna division into corresponding subsets may be dynamically and adaptively performed by the BIAS module 72 depending on the received triggers, as discussed later with reference to FIGS. 9-16. For ease of discussion of FIGS. 6-7, all possible antenna divisions are not addressed. Rather, it is assumed, by way of an example, that the first subset includes two antennas 64, 66 selected for LTE support—one antenna 64 configured to operate as a "main" antenna and the second antenna 66 configured to operate as an "auxiliary" (Aux) antenna. On the other hand, the second subset includes two antennas 68, 70 selected for WiFi (WLAN) support—one antenna 70 configured to operate as the "main" antenna and the other antenna 68 configured to operate as the Aux antenna. Based on the detected wireless mode (here, the "LTE only" mode at block 100), the BIAS module 72 may operate each antenna in the first subset (associated with LTE antennas) in a pre-determined determined configuration. As seen under the "LTE only" column in FIG. 6, such pre-determined configuration for LTE antennas 64, 66 (main as well as auxiliary) may be referred to as a "traffic" mode in which the corresponding antenna is activated (if not activated earlier) and remains activated (powered on) to perform LTE-specific wireless transmissions/receptions. On the other hand, the BIAS module 72 may operate each of the WLAN antennas 68, 70 in the second subset in one of the following two pre-determined operating configurations listed under the "LTE only" column in the table 90 in FIG. 6—either in the "idle" mode or the "off" mode, both of which are already mentioned before. Depending on the design considerations, in some embodiments, both of the WLAN antennas 68, 70 may be placed in the "idle" mode, or both may be placed in the "off" mode, or the WLAN main antenna 70 may be placed in the "idle"

mode and the WLAN Aux antenna 68 may be placed in the "off" mode, or the WLAN Aux antenna 68 may be placed in the "idle" mode and the WLAN main antenna 70 may be placed in the "off" mode. The design considerations may include analysis of a plurality of triggers (such as, for example, device orientation, the status of one or more displays in the device, and so on), prior history of user's wireless mode selections, the status of wireless mode-specific software applications being activated by the user, and the like.

The above-mentioned antenna-specific operating configuration initially established at block 100 may be automatically and dynamically changed depending on the plurality of triggers analyzed by the BIAS module 72. As noted before, for each broadband antenna 64, 66, 68, 70, the BIAS module 72 may continually monitor multiple triggers—such as for example, computing device's 50 orientation, surrounding noise level, SAR proximity information for the device 50, and so on—that are capable of affecting the signal quality of the respective antenna in the antenna-specific operating configuration. In some embodiments, a user may be allowed to change the initial/default BIAS settings through the device display screen 56 or 58. Thus, depending on the BIAS setting and/or analysis of received triggers (block 102), the BIAS module 72 may increase the performance from four antennas 64, 66, 68, 70 in the "LTE only" mode, as noted at block 104. In some embodiments, as part of block 104, the BIAS module 72 may select a new operating configuration of at least one of the antennas 64, 66, 68, 70. For example, if the analysis of triggers indicates that it is desirable to switch the operating configuration of at least one antenna in the first subset (which includes antennas 64, 66 as mentioned before), the BIAS module 72 may switch one or both of the antennas 64, 66 from the "traffic" mode to either the "idle" mode or the "off" mode. As a result of such switching, the BIAS module 72 also may switch the operating configuration of at least one antenna in the second subset (which includes antennas 68, 70) to the "traffic" mode for LTE support. Such dynamic and intelligent (trigger-adaptive) switching of antennas at run-time may significantly improve wireless performance of the computing device 50 over the existing techniques of frequency band switching or beam-forming on a single antenna.

Figure 7:
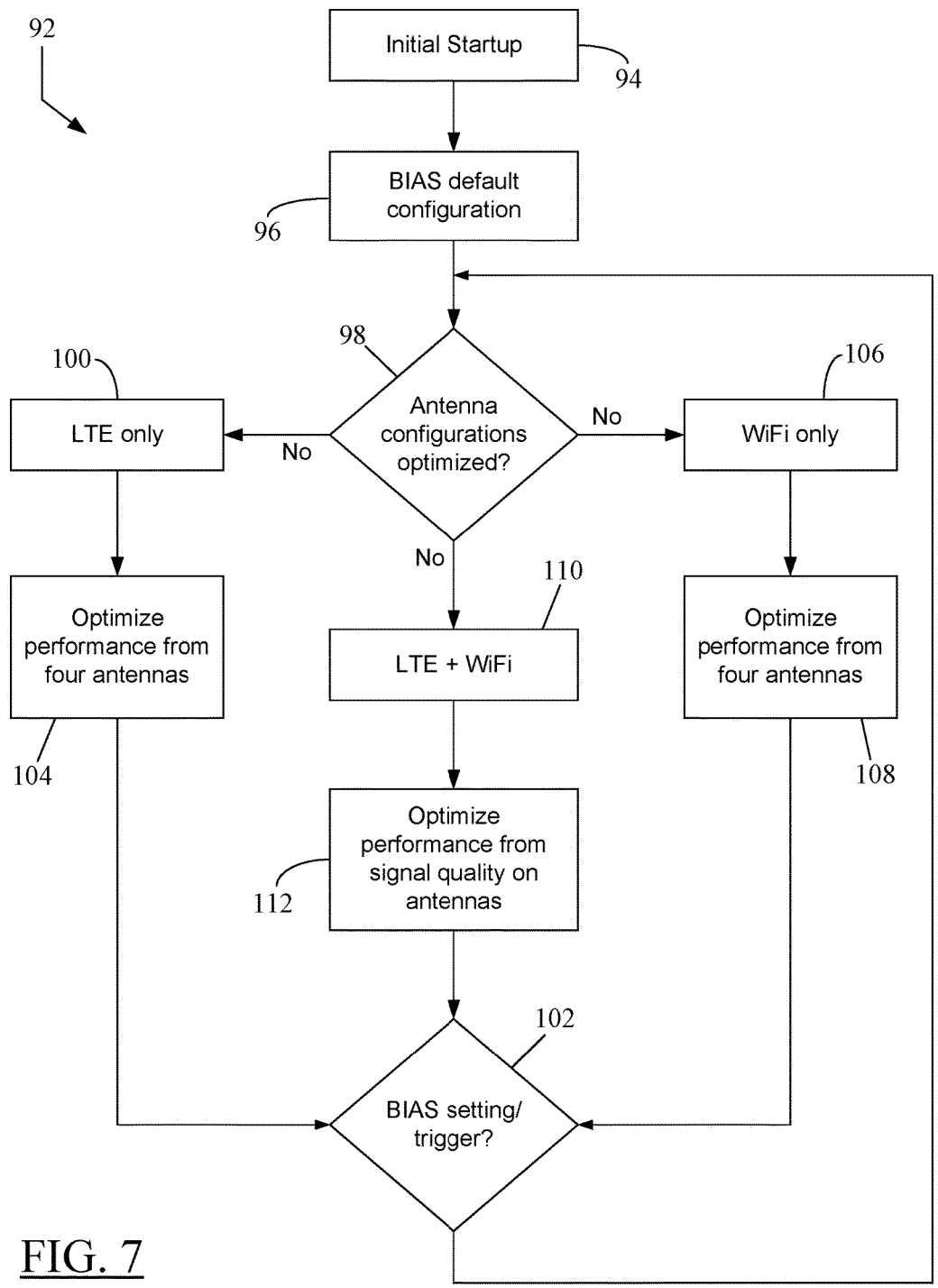
FIG. 7 is an exemplary flowchart of operations of a BIAS module according to some embodiments.
Figures 9A, 9B, 9C, 9D:
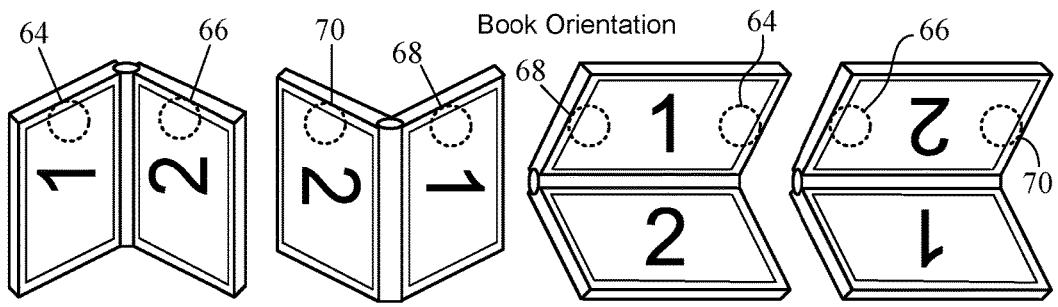
Figures 10A, 10B:
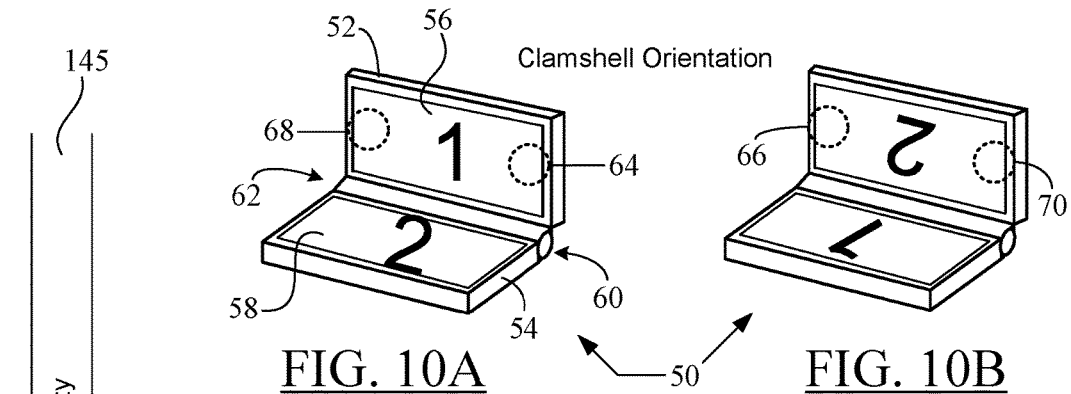

Referring to FIG. 7, the blocks 106, 108 are similar to blocks 100, 104, respectively, except that the blocks 106, 108 relate to a "WiFi only" mode. In other words, instead of the "LTE only" mode at blocks 100, 104, the user has selected "WiFi only" mode at block 106. However, the foregoing discussion of tasks performed by the BIAS module 72 at blocks 100, 104 for "LTE only" mode equally applies to the "WiFi only" choice at blocks 106, 108, and, hence, a detailed discussion of BIAS operations associated with blocks 106, 108 is not provided here. For example, at block 106, the BIAS module 72 may divide the antennas 64, 66, 68, 70 into two subsets—the first subset containing antennas 64 (main), 66 (aux) for WiFi (WLAN) support, and the second subset containing antennas 68 (main), 70 (aux) for LTE support. The antennas in the first subset may be placed in the "traffic" mode, whereas the antennas in the second subset may be either "idle" or "off" as indicated under the "WLAN only" column in the table 90 in FIG. 6. Blocks 102, 108 may result in switching the operating configuration of at least one antenna in the first subset and, possibly, at least one antenna in the second subset, as discussed before with reference to block 104 for the "LTE only" case.

If the BIAS module 72 detects that the user has selected both the LTE and the WLAN (WiFi) modes (block 110 in FIG. 7), the BIAS module 72 may initially configure the antennas 64 (main) and 66 (Aux)—constituting the first subset here—to operate in the LTE-specific "traffic" mode, and the antennas 68 (main) and 70 (Aux)—constituting the second subset here—for the WLAN (WiFi)-specific "traffic" mode, as indicated under the "Co-Existence" column in the table 90 in FIG. 6. The antenna performance may be changed (e.g., to provide increased throughput) at block 112 from analysis of signal quality on antennas affected by various triggers. Block 112 may result in switching of the operating configuration of at least one antenna in the first subset and, possibly, at least one antenna in the second subset, as discussed before with reference to block 104 for the "LTE only" case. Because of earlier extensive discussion of BIAS operations at blocks 100 and 104 associated with the "LTE only" case, and because of applicability of the overall principles of that discussion to the LTE+WLAN co-existence case at blocks 110 and 112 as well, additional discussion of blocks 110, 112 is not provided here for the sake of brevity.

It is noted here that the above discussion of FIGS. 6-7, and later illustrations in FIGS. 9-14, with various antenna subsets and operating configurations is exemplary only. In practice, different antennas may be placed in different operating configurations by a BIAS module than those discussed above depending on the triggers and relevant design considerations. Additional options to improve throughput of the antennas may be possible as well. For example, in certain embodiments, a BIAS module may notify the user to change the orientation of the computing device as suggested by BIAS to increase the quality of antenna signals. Such notification and suggestion may be provided, for example, as a visual cue, arrow, image, or text message on a display screen of the user's computing device. The suggestion may be, for example, to place the device in a book mode, or to keep the device in a tablet mode, or to remove any object or human body part (e.g., human hand) blocking a specific antenna location on the device, and so on.

FIGS. 8-16 relate to examples of antenna selection by BIAS based on SAR proximity data and certain other triggers. However, prior to discussion of FIGS. 8-16, a brief overview of various triggers that are capable of affecting the quality of signals received by or transmitted from a broadband antenna—like any of the antennas 27-30 (FIG. 2) or 64, 66, 68, 70 (FIG. 3)—is provided for background context. Following are examples of some triggers:

(i) It is known that the Specific Absorption Rate (SAR) is a measure of the rate of absorption of RF energy in the human body. Thus, SAR is an indication of RF exposure provided by the consumer device when the device is operated in a wireless mode. Different consumer wireless devices, like smartphones and tablets, mention their SAR thresholds under corresponding wireless technologies—LTE only, WiFi only, LTE+WiFi, and so on. Thus, a trigger may be generated when there is a change in a SAR-based pre-defined location of the computing device. For example, the user-selected wireless mode of operation may have associated SAR thresholds and location/distance requirements for physical separation between the device and the user. A change in the separation or device's pre-defined location may indicate the possibility of triggering SAR proximity. A trigger also may be generated when the human-device proximity may be unacceptable under the wireless mode-specific SAR requirement even though the device location is not changed. For example, when an antenna is transmitting at a power level that satisfies (e.g., exceeds) the SAR threshold, a SAR-related trigger may be generated.

(ii) Another exemplary trigger is an output from a proximity sensor detecting hand, body, or metallic material near an antenna. In particular embodiments, there may be one proximity sensor associated with each broadband antenna, and the sensor output (or trigger) may indicate the extent of proximity of a human or a non-human object to the computing device.

(iii) Triggers also may be received from one or more accelerometers and/or gyroscopes in the device detecting the orientation (or a change in the orientation) of the device. Another trigger may indicate the hinge angle of the device as discussed later with reference to FIG. 8.

(iv) In particular embodiments, a trigger may be generated when a source of electrical noise is detected. For example, when a device has two or three or multiple pieces of displays or flexible, foldable displays, the changes in the backlight brightness of a display or in the operational status of a display (for example, the turning on/off of a display) may generate electrical noise in the form of certain frequencies and their harmonics that could degrade the integrity of an antenna signal. Other sources of similar electrical noise include the operation of on-device camera(s) in the "preview" mode, frequent detections of device IDs of USB devices, simultaneous operation of multiple USB devices along with wireless radios, Hard Disk Drive (HDD), and other Input/Output (I/O) units connected to the computing device, AC charging of the computing device, and the like.

Figure 15:
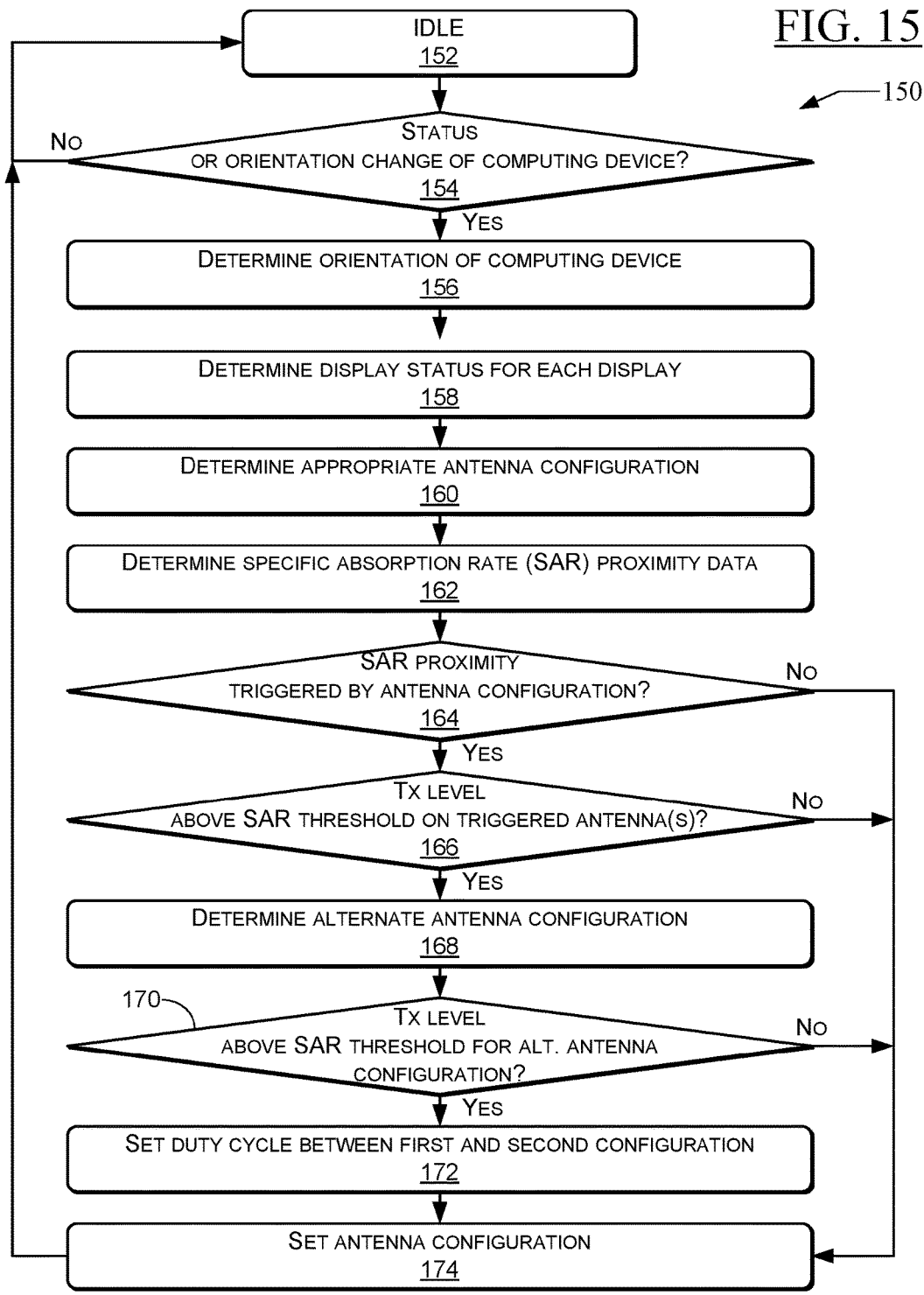
FIG. 15 is a flowchart of an antenna selection process that includes evaluation of data from multiple sensors by a BIAS module according to some embodiments.

(v) A consumer device like that shown in FIGS. 3-4 may have two housings, each containing its own pair of antennas. The consumer device may be placed in a tablet orientation (FIG. 13) or a closed orientation (FIG. 11) or any of a number of different orientations shown in FIGS. 9-14. As discussed with reference to FIG. 6, any two antennas in the consumer device may be in the "traffic" mode when either the "LTE only" or the "WiFi only" modes are selected by the user. On the other hand, in the LTE+WiFi co-existence case, all of the four antennas 64, 66, 68, 70 may be in the "traffic" mode. In that case, the SAR detection threshold may change because of activation of two wireless modes on the device. In particular embodiments, the device-based BIAS module, such as the BIAS module 72 in FIG. 3, may monitor SAR levels under each of the different wireless modes—SAR under LTE only, SAR under WiFi only, and SAR under LTE+WiFi—and switch the operating configuration of one or more antennas when wireless mode-specific SAR thresholds are triggered. The later-discussed exemplary flowchart in FIG. 15 illustrates details of antenna configuration selection based on detected SAR proximity data. It is noted here that, in some embodiments, the user may be allowed to instruct the device which wireless mode gets priority—LTE or WiFi—for SAR detection in the radio co-existence situation. An embedded controller (hardware) or software logic may be included as part of the device's BIAS module to present the user with the option of setting the priority using a touch input via a display screen of the device and also to receive/process the user's priority selection. Based on the user's priority setting, the BIAS module may configure the antennas such that the SAR thresholds for the higher priority wireless mode are addressed first. If desired, the SAR thresholds for the lower priority wireless mode may be then addressed without modifying the antenna configurations of the main and Aux antennas associated with the higher priority mode.

(vi) In particular embodiments, analysis of an Over-The-Air (OTA) signal received by an antenna and associated with the user-selected wireless mode of operation may provide a trigger to the BIAS module for antenna reconfiguration. For example, in LTE, an OTA signal with/without return loss information may provide values related to one or more of the following parameters: Packet Error Rate (PER), Received Signal Strength Indicator (RSSI), Reference Signal Received Power (RSRP), and Reference Signal Received Quality (RSRQ). In case of WLAN, an OTA signal with/without return loss information may provide PER. In the embodiments where an OTA signal contains return loss information, the output of an antenna tuner (or RF Front End) may be used to calculate antenna return loss. Furthermore, the PER value may depend on the antenna's data throughput, which may be controlled by Applied Power (AP) to the antenna. Thus, a BIAS module as per particular embodiments of the present disclosure may monitor information contained in the OTA signals to accordingly adjust antenna power or operating configuration (for example, switching the antenna from the "traffic" mode to the "idle" mode, and the like) for better quality of the overall signal transmitted/received by the antenna. In some embodiments, the BIAS module may detect an antenna "shift" to avoid antenna signal loss. For example, when a user's hand is partially blocking an antenna, such blocking may cause a shift in the transmission frequency of the antenna. The BIAS module may detect the "shift" and alert the user with appropriate audible or visible message (such as an alert sound or text display).

FIG. 8 is a partial block diagram of the computing device 50 shown in FIGS. 3-4 according to some embodiments. As shown, the computing device 50 may include a SAR sensor hub 115 that receives sensor data from a number of different sensors and generates appropriate trigger(s) for further processing by the BIAS module 72 under operative control of a processor or device manager (not shown) similar to the processor 41 in the embodiment of FIG. 2. In certain embodiments, the sensor hub 115 may simply collect the sensor data from different sensors and pass all the received sensor data to the BIAS module 72, which can then analyze the sensor data to determine which sensor data qualifies as a potential "trigger" requiring further processing for selecting another antenna configuration with improved throughput. Thus, the architecture shown in FIG. 8 relates to the BIAS module's improvement of antenna performance using contextual switching based on SAR proximity data and other triggers, as discussed in further detail with reference to FIGS. 9-16.

In some embodiments, the sensor hub 115 may be a component of a Peripheral Controller Hub (PCH) (not shown), such as an Integrated Sensor Hub (ISH) implemented as a driver in an Operating System (OS) of the computing device 50. The sensors sending data to the SAR sensor hub 115 may include SAR proximity sensors 117-120, a hinge angle indicator 122, a first set of device orientation and rotation detection sensors 124 located within the first housing 52, and a second set of device orientation and rotation detection sensors 126 located within the second housing 54. In particular embodiments, the components 115, 117-120, 122, 124, and 126 may constitute a sensor unit similar to the sensor unit 47 shown in FIG. 2. In one embodiment, the first and the second sets 124, 126 may include substantially similar sensors. Thus, as shown in FIG. 8, each sensor set 124, 126 may include a 9-axis accelerometer, a gyroscope, and an E-compass or digital compass (which is a sensor that provides orientation in relation to earth's magnetic field so that the displayed content is aligned with the user's orientation regardless of the orientation of the display screen). In one embodiment, the hinge angle detector 122 may be an optical sensor such as, for example, a fiber optic cable to sense the hinge angle through reflection of light or an optical encoder placed in a hinge to count a hinge's opening/closing movement via reflections of light from black-and-white strips placed nearby. Each proximity sensor 117-120 may be placed adjacent to the corresponding broadband antenna 64, 66, 68, 70 to detect the extent of proximity of a human hand or body part or a non-human object to the respective antenna. The human proximity to the antenna may be sensed by the appropriate sensor(s) 117-120 and may trigger SAR threshold evaluation by the BIAS module 72 as discussed later with reference to FIG. 15. Furthermore, if an antenna signal is being blocked—for example, if a human hand is partially or fully covering the antenna or an object is placed over an antenna location—the corresponding proximity sensor 117-120 may detect a "weak" signal level from the antenna, which may require the BIAS module 72 to take appropriate remedial measures including, for example, switching the active antennas and/or alerting the user to remove the hindrance.

In FIG. 8, the broadband antennas 64, 66, 68, 70 are shown connected to the BIAS module 72, which may include an RF crossbar unit (not shown) that may operate as a switch to simultaneously connect two of the four antennas to an RF unit 130 depending on which antennas are selected by the BIAS module 72 to be the "main" antennas. For example, if the "LTE+WLAN" mode is selected by the user and if the BIAS module 72 configures the antenna 64 as the "main" antenna for the LTE mode and the antenna 70 as the "main" antenna for the WLAN mode, the BIAS module 72 may configure an RF baseband unit 132 in the RF unit 130 to receive a multiplexer (MUX) control signal 134 therefrom to connect one of these two "main" antennas to its Antenna_Line1 terminal 136 and the other to its Antenna_Line2 terminal 138 via a crossbar unit. In some embodiments, a "main" antenna and an "auxiliary" antenna may be connected to the lines 136, 138 when a single wireless mode—like "LTE only"—is selected. Alternatively, in such a single mode case, the "main" antenna may be connected to one of the antenna lines 136, 138, and other antennas may not be connected to the other line. Furthermore, in some embodiments, there may be more than two antenna lines—like the antenna lines 136, 138—associated with the BIAS module 72, and appropriate antennas may be connected to those lines under the control of the BIAS module 72. It may be desirable, however, to have at least two antenna lines 136, 138 to accommodate at least two "main" antennas in the "traffic" mode, especially when co-existence of LTE and WLAN is desired.

When the operating configurations of antennas change, the control signal 134 may be asserted to connect appropriate antennas to the line terminals 136, 138. Thus, different antennas may be connected to the antenna lines 136, 138 dynamically as selected by the BIAS module 72 based on different triggers.

The RF unit 130 may be similar to the RF unit 34 in the embodiment of FIG. 2. Hence, the RF unit 130 is not discussed in any significant detail. It is noted, however, that the RF baseband unit 132 in the RF unit 130 may include component units similar to the units 36-39 in FIG. 2 to perform protocol-specific signal processing. On the other hand, an RF Front End Module (RFFEM) 140 in the RF unit 130 may include an RF tuner (not shown) to convert the received RF signals into a frequency suitable for processing by the RF baseband unit 132 and also to convert the frequency of the content to be transmitted to the appropriate RF band associated with the associated wireless mode of operation.

Because the configuration shown in FIG. 8 is a specific implementation of the general configuration shown in FIG. 2, it remains substantially similar to the configuration in FIG. 2. Therefore, additional components shown in FIG. 2 are not shown in FIG. 8 for the sake of simplicity of the drawing. It is understood, however, that the computing device 50 in FIG. 8 also includes one or more processors like the processor 41, a radio modem (which may or may not be a part of the RF unit 130) like the radio modem 43, one or more memory units (not shown), and other peripheral components, as discussed later with reference to FIG. 17.

FIGS. 9-14 illustrate different orientations of a dual-display device and the antennas thereof that may be selected by a BIAS module as "main" antennas for improved signal quality based on an analysis of a number of triggers as per particular embodiments of the present disclosure. For ease of discussion, the term "FIGS. 9-14" is used to collectively refer to all of the drawings FIGS. 9A, 9B, 9C, 9D, 10A, 10B, 11A, 11B, 12A, 12B, 12C, 12D, 13A, 13B, 13C, 13D, 14A, and 14B. The embodiments in FIGS. 9A, 9B, 9C, 9D, 10A, 10B, 11A, 11B, 12A, 12B, 12C, 12D, 13A, 13B, 13C, 13D, 14A, and 14B relate to the dual-display device 50 shown in FIGS. 3-4. Therefore, the same reference numerals are used in FIGS. 9-14 for the identical components shown in FIGS. 3-4. The BIAS module performing the trigger-based antenna selection may be the BIAS module 72 shown in FIG. 3, but not shown in FIGS. 9-14. As discussed later, in particular embodiments, the BIAS module 72 may perform the tasks illustrated in the flowchart 150 of FIG. 15 to determine the improved antenna selections shown in FIGS. 9-14 based on a number of triggers detailed in the table/chart 176 in FIG. 16. It is noted here that the illustrations in FIGS. 9-14 are exemplary only; they do not show all possible orientations of the dual-display device 50. In the context of FIGS. 9-14, it is observed that selection of two "main" antennas may allow the device 50 to simultaneously support cellular (LTE) and WLAN (WiFi) modes in the manner discussed before with reference to FIGS. 6-7. For clarity of drawings and to avoid clutter, only the relevant parts are identified with reference numerals in various orientations. For example, except FIG. 10A, all other remaining drawings in FIGS. 9-14 identify each display screen of the device 50 using only the big-size, bold number "1" or "2" as shown in FIGS. 3-4, and not using the corresponding reference numeral "56" or "58". Similarly, the BIAS module selected "main" antennas for a given orientation are shown in FIGS. 9-14 using dotted circles, which are identified using corresponding reference numerals from FIGS. 3-4. In particular embodiments, the antennas may be selected for a specific orientation of the device 50 even if the user has not yet selected a wireless mode of operation. Once the user selects a wireless mode, additional SAR-related data for the selected wireless mode may be evaluated to adjust or modify the initial operating configuration of the selected antenna(s) associated with the wireless mode, as explained later with reference to FIG. 15.

In FIGS. 9-14, the BIAS-selected antennas are identified using the device orientation in FIG. 3 as a "reference". In other words, when the device 50 is placed on a surface with both display screens 56, 58 opened as shown in FIG. 3, the display screen "1" (with reference numeral "56") will be on the left side and the display screen "2" (with reference numeral "58") will be on the right side of the hinges 60, 62. Furthermore, in the "reference" orientation of FIG. 3, the antenna 64 is at the top and the antenna 68 is at the bottom of the rectangular section forming the display screen 56, and the antenna 66 is at the top and the antenna 70 is at the bottom of the rectangular section forming the display screen 58. In FIGS. 9-14, the arrow with reference numeral "145" shows the downward direction of gravity, which may affect sensor data (for example, gyroscope output) as well as BIAS's antenna selections in a given device orientation. Furthermore, in some drawings in FIGS. 9-14, one or both of the screen numbers "1" and "2" (written in bold and large size) may be upside down to indicate physical rotation of the screen from its "reference" orientation, but the displayed content may be appropriately rotated so that the user can comprehend it. This is similar to current smartphones or tablets where a physical rotation of the device screen rotates the displayed content as well.

Figures 11A, 11B:
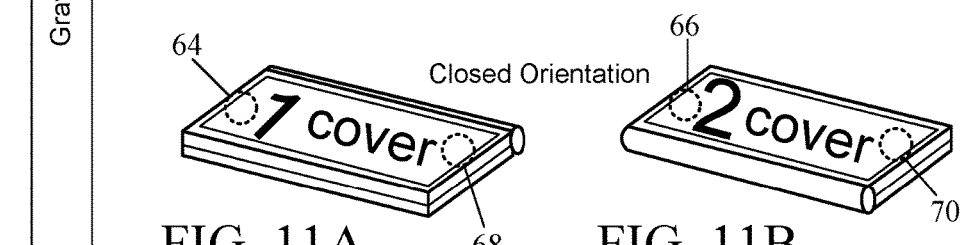
Figures 12A, 12B, 12C, 12D:
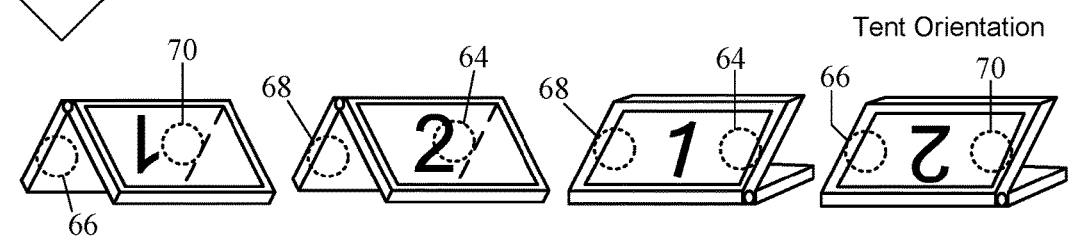

Various exemplary orientations of the computing device 50 in FIGS. 9A-9D may be referred to as "book orientations" where the angle between the housings 52, 54 may be approximately between 0 and 180 degrees (e.g., 150 degrees, 120 degrees, 90 degrees, 60 degrees, 30 degrees, or the like) and one or both of the display screens 56, 58 may get rotated from their "reference" orientation in FIG. 3. In the exemplary "clamshell orientations" in FIGS. 10A-10B, 608, the angle between the housings 52, 54 may be approximately between 0 and 90 degrees (e.g., 90 degrees, 75 degrees, 60 degrees, 45 degrees, 30 degrees, 15 degrees, or the like). In the orientations shown in FIGS. 9A-10B, both of the displays 56, 58 may be facing the user. However, in the exemplary "closed orientations" in FIGS. 11A-11B, one of the display screens 56, 58 may be facing the user as shown. In the closed orientation, the angle between the housings 52, 54 may be approximately 0 degree. The antennas selected in the closed orientations in FIGS. 11A-11B are in the housing of the respective display screen forming the cover. The device orientations in FIGS. 12A-12D are exemplary "tent orientations" where the angle between the housings 52, 54 may be approximately between 0 and 180 degrees (e.g., 150 degrees, 120 degrees, 90 degrees, 60 degrees, 30 degrees, or the like). In the tent orientation, one display screen may be facing the user whereas the other display screen may be facing away from the user, as shown. Furthermore, in certain tent orientations, the BIAS module 72 may select antennas from the housing that is away from the user as shown, for example, in FIGS. 12A-12B. Like the closed orientations in FIG. 11, the "tablet orientations" in FIGS. 13A-13D also may have one of the display screens 56, 58 facing the user as shown and the angle between the housings 52, 54 also may be approximately 0 degree. In the tablet orientations in FIGS. 13A-13D, one display screen may be facing the user whereas the other display screen may be facing away from the user. The "flat orientations" in FIGS. 14A-14B may be similar to the orientations shown in FIGS. 3-4. In the flat orientation, the angle between the housings 52, 54 may be approximately 180 degrees.

As noted before, in some embodiments, for each orientation in FIGS. 9-14, the BIAS module 72 may select a pair of orientation-specific "main" antennas (shown using dotted circles in FIGS. 9-14) by performing the tasks illustrated in the flowchart 150 in FIG. 15. In addition to the SAR-based evaluations in FIG. 15, the BIAS module 72 also may evaluate inputs from a number of sensors as summarized in the table 176 in FIG. 16 to select the antenna configuration for each orientation that provides the most throughput.

FIG. 15 is a flowchart 150 of an antenna selection process that includes evaluation of data from multiple sensors by a BIAS module, such as the BIAS module 72 in FIG. 3, according to some embodiments. In the flow diagram of FIG. 15 (and also in the flow diagrams of FIGS. 5 and 7), each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described in FIGS. 5, 7, and 15 is not intended to be construed as a limitation, and any number of the described operations can be combined in any order and/or in parallel to implement the processes. For discussion purposes, the process 150 is described with reference to FIGS. 3-4 and 8 as discussed above, although other models, frameworks, systems and environments may be used to implement this process. It is understood that any of the processes in FIGS. 5, 7, and 15 may be performed by one or more components of the computing device 25 of FIG. 2 or the computing device 50 of FIG. 3.

Initially, at block 152, the BIAS module 72 may remain in an idle state until there is a change in the status or orientation of the computing device 50 at block 154. The status or orientation change may include turning on/off of a display, change in the device hinge angle, data inputs from accelerometer and/or gyroscope, triggering of a SAR proximity event, magnetic or electro-magnetic interference, and the like. As discussed with reference to FIG. 8, various sensors in the device 50 may detect such status or orientation change and provide appropriate sensor data to the sensor hub 115 for evaluation by the BIAS module 72. In response to a change indication at block 154, the BIAS module 72 may determine the orientation of the device 50 at block 156 using sensor data from, for example, accelerometer, gyroscope, E-compass, and hinge angle indicator. At block 158, the BIAS module 72 also may determine the display status (on or off) of each display 56, 58. Based on the determinations at blocks 156, 158, the BIAS module 72 may determine appropriate operating configurations for the device antennas 64, 66, 68, 70 (block 160). FIGS. 9-14 illustrate exemplary antenna selections for different device orientations. In one embodiment, the BIAS module 72 may select appropriate "main" and "auxiliary" antennas based on the device orientation using a chart similar to the chart 176 in FIG. 16.

At block 162, the BIAS module 72 may determine SAR proximity data based on the inputs received from one or more of the SAR proximity sensors 117-120. As mentioned before, SAR proximity may be triggered, for example, when a human body or part thereof is covering an active antenna (for example, a BIAS-selected "main" antenna that is operating in the "traffic" mode for the user-selected wireless technology). If the antenna configuration selected at block 160 does not trigger SAR proximity concerns (block 164) for any of the antennas, the BIAS module 72 may maintain the originally-selected operating configuration of antennas 64, 66, 68, 70 (block 174) and return to the idle state (block 152) if there is no further change detected in the status or orientation of the device 50 (block 154). On the other hand, if SAR proximity is indeed triggered at block 164 for at least one of the antennas, the BIAS module 72 may determine at block 166 if the transmit (TX) power level satisfies (e.g., exceeds) the SAR threshold for the user-selected wireless configuration (e.g., LTE, WiFi, and the like) on the triggered antenna(s)—that is, the antenna(s) which is placed in the "traffic" mode of operating configuration at block 160 for the user-selected wireless mode. If the TX level does not satisfy (e.g., is below) the SAR threshold, the process may lead to block 174 and then to the idle state (block 152) if there is no further change detected in the status or orientation of the device 50 (block 154). However, if a higher TX level is determined at block 166, the BIAS module 72 may determine an alternate antenna configuration at block 168. For example, in one embodiment, an antenna selection chart similar to the chart 176 in FIG. 16 may be used to switch the operating configuration of the SAR-triggering antenna from the "main" antenna to an "auxiliary" (or secondary) antenna or to select a different antenna to operate as the "main" antenna in place of the SAR-triggering antenna.

After switching the operating configuration of one or more antenna(s) at block 168, the BIAS module 72 may further ascertain, at block 170, whether the TX level satisfies (e.g., exceeds) the relevant SAR threshold for one or more of the wireless mode-specific antennas in the alternate antenna configuration. If the TX level now does not satisfy (e.g., is below) the SAR threshold in the alternate antenna configuration selected at block 168, the BIAS module 72 may maintain the alternate antenna configuration (block 174) and then return to the idle state (block 152) if there is no further change detected in the status or orientation of the device 50 (block 154). On the other hand, if the TX level still satisfies (e.g., exceeds) the SAR threshold at block 170, the BIAS module 72 may attempt to ameliorate the effect of the higher TX level without suddenly reducing the TX power of the SAR-triggering antenna. For example, in one embodiment, the BIAS module 72 may set the duty cycle of the SAR-triggering antenna between a duty cycle value associated with the first operating configuration (at block 160) and a duty cycle value associated with the second operating configuration (at block 168) as noted at block 172. For example, if the SAR-triggering antenna is currently operating at 20 dB of TX power level 100% of the time, then, at block 172, the BIAS module 72 may reduce its duty cycle to 50% so that the antenna still operates at 20 dB level, but 50% of the time. In that case, the TX level over the entire duty cycle may remain below the relevant SAR threshold and, hence, may be tolerable under relevant SAR requirements. The duty cycle adjustment approach at block 172 may allow TX power reduction over a period of time instead of an abrupt power reduction, which may not be desirable. In other embodiments, the values of adjusted duty cycles may be different from the exemplary 50% duty cycle value mentioned here.

At block 174, the new duty cycle-based operating configuration may be established for the antenna at issue. The process may then return to the idle state (block 152) if there is no further change detected in the status or orientation of the device 50 (block 154). In particular embodiments, the BIAS module 72 may continue to remain at block 174 for a pre-determined time to further decrease the duty cycle—for example, linearly over the pre-determined period of time—prior to returning to the idle state at block 152. In some embodiments, a duty cycle may be reduced in a step-by-step manner with a pre-determined amount of reduction at each step. In particular embodiments, SAR threshold may be evaluated after each duty cycle reduction so as to operate an antenna at a TX level allowable under SAR without significantly sacrificing the antenna signal quality.

FIG. 16 is an exemplary chart/table 176 illustrating which antennas may be selected as "main" and "auxiliary" antennas by a BIAS module, such as the BIAS module 72 in FIG. 3, depending on the device orientation in the embodiments of FIGS. 9-14. In one embodiment, the BIAS module 72 may use the process of FIG. 15 in conjunction with the chart 176 to adaptively change antenna selections in view of a plurality of sensor triggers, as discussed before. In the chart 176 in FIG. 16, the column "ANT1" relates to the antenna 64, the column "ANT2" relates to the antenna 66, the column "ANT3" relates to the antenna 68, and the column "ANT4" relates to the antenna 70 in FIGS. 3-4. The chart 176 also lists which sensor(s) or other trigger (such as, for example, display status) may be used by the BIAS module 72 to determine device orientation and, hence, to select the appropriate, orientation-specific antenna configuration from the chart 176. For example, based on an analysis of the data from accelerometers in the housings 52, 54, the hinge angle indicator 122, and information about the on/off status of the displays 56,58 (because a display "on" status may affect antenna noise level), the BIAS module 72 may determine whether the computing device 50 is in the "tablet" orientation of FIG. 13C or FIG. 13D or in the "closed" orientation of FIG. 11A or FIG. 11B, as noted in the chart 176. The corresponding figure from FIGS. 9-14 is also mentioned against each device orientation listed in the table 176 so as to facilitate easy reference. Once the actual device orientation is determined, the BIAS module 72 may make initial antenna selections as per the chart 176 and also may analyze data from one or more of the relevant SAR proximity sensors 117-120 to make necessary adjustments to antenna selections. As discussed with reference to FIG. 15, the SAR proximity data may require selection of an alternate antenna configuration or switching the operating configuration of at least one antenna to an alternate configuration. In the table 176, the letter "X" under an antenna column indicates that the antenna is selected to operate as a "main" (primary) antenna for the corresponding device orientation. Similarly, the letter "O" under an antenna column indicates that the antenna is selected to operate as an "auxiliary" (secondary) antenna for the corresponding device orientation. Each device orientation may have two "main" antennas to allow for simultaneous support of cellular (such as LTE) and WLAN (such as WiFi) wireless modes—one "main" antenna per wireless mode.

Figure 17:
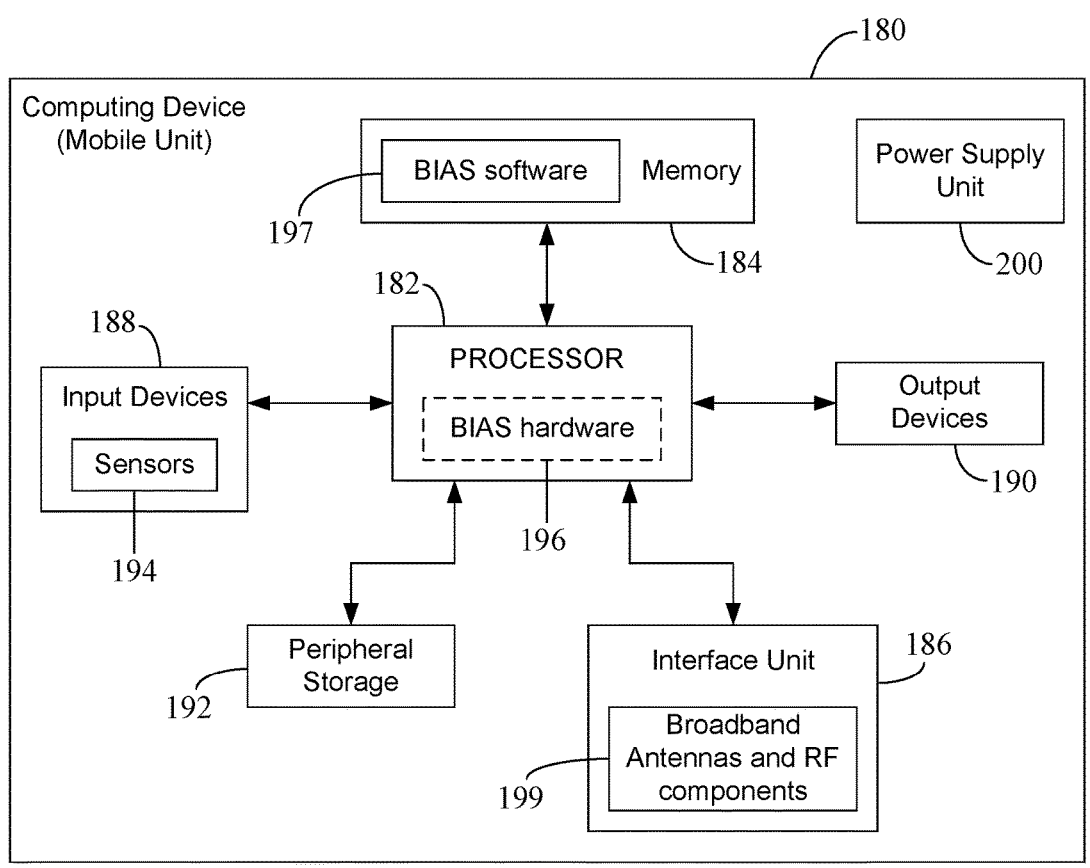
FIG. 17 illustrates an example configuration of a computing device that can be used to implement the systems and techniques described herein.

FIG. 17 illustrates an example configuration of a computing device (or mobile unit) 180 that can be used to implement the systems and techniques described herein. In particular embodiments, the computing device 180 may be the device 25 shown in FIG. 2 or the device 50 shown in FIG. 3. The computing device 180 may be suitably configured to implement the BIAS functionality according to the teachings of the present disclosure. The computing device 180 may include one or more processors 182, a memory unit 184, an interface unit 186 providing communication interfaces, one or more input devices 188, one or more output devices 190, and a peripheral storage unit 192, connected to the processor 182 as shown and configured to communicate with each other, such as via one or more system buses (not shown) or other suitable connection.

In one embodiment, the input devices 188 may provide data inputs—such as user input selecting a wireless mode, camera images, sensor data, and the like—to the processor 182 for further processing. A sensor unit 194, such as the sensor unit 47 in FIG. 2, may form a part of the input devices 188. In one embodiment, the sensor unit 194 may include the components 115, 117-120, 122, 124, and 126 in FIG. 8. Other input devices 188 may include, for example, a touchpad, a camera, a Global Positioning System (GPS) sensor, a computer keyboard, a touch-screen, a joystick, a physical or virtual "clickable button," a computer mouse/pointing device, and the like. A display screen is an example of the output device 190. In the embodiment of FIG. 3, the display screens 56, 58 may function as both an input device 188 as well as an output device 190. Other examples of an output device include a graphics/display device, a computer screen or monitor, an alarm system, or any other type of data output device. In some embodiments, the input device(s) 188 and the output device(s) 190 may be coupled to the processor 182 via an I/O or peripheral interface(s). In some embodiments, the computing device 180 may include more than one instance of the components shown. In various embodiments, all of the components shown in FIG. 17 may be housed within a single housing. In other embodiments, the computing device 180 may not include all of the components shown in FIG. 17. Furthermore, the computing device 180 may be configured as a standalone system, as a server system, as a client system, or in any other suitable form factor.

The processor 182 is a hardware device that may include a single processing unit or a number of processing units, all of which may include single or multiple computing units or multiple cores. In one embodiment, the processor 182 may be the device manager 41 shown in FIG. 2. When the computing device 180 is a multiprocessor system, there may be more than one instance of the processor 182 or there may be multiple processors coupled to the processor 182 via their respective interfaces (not shown). The processor 182 may include an integrated Graphics Processing Unit (GPU) or the GPU may be a separate processor device in the mobile unit 180. The processor 182 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 182 may be configured to fetch and execute computer-readable instructions stored in the memory 184, the peripheral storage 192, or other computer-readable media. In some embodiments, the processor 182 may be a System on Chip (SoC).

When the BIAS functionality as per teachings of the present disclosure is implemented as a combination of hardware and software, the hardware or digital logic circuits of a BIAS module—such as the BIAS module 72 in FIG. 3—and associated microcode may be implemented as part of the processor unit 182, as indicated by an exemplary dotted block 196 in FIG. 17. The BIAS hardware 196 may communicate with a corresponding BIAS software 197 (discussed below) in the memory unit 184 to cause the processor 182 to perform various BIAS-related operations discussed before with reference to the embodiments in FIGS. 2-16. In some embodiments, the entire BIAS module, such as the BIAS module 72 in FIG. 3, may be implemented as a separate unit (not shown) connected to various circuit components and the processor 182, similar to the configuration shown in FIG. 2. Generally, the BIAS functionality discussed with reference to the embodiments in FIGS. 2-16 may be considered to be provided by the computing device 180 when the BIAS software 197 is executed by the processor 182.

The memory 184 and the peripheral storage unit 192 are examples of non-transitory computer media (e.g., memory storage devices) for storing instructions that can be executed by the processor 182 to perform the various functions described herein. For example, the memory unit 184 may include both volatile memory and non-volatile memory (e.g., RAM, ROM, or the like). Further, in particular embodiments, the peripheral storage unit 192 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 184 and mass storage devices constituting the peripheral storage 192 may be collectively referred to as memory or computer storage media herein, and may be a media capable of storing computer-readable, processor-executable program instructions as computer program code that can be executed by the processor 182 as a particular machine configured for carrying out the operations and functions described in the implementations herein.

In some embodiments, the BIAS functionality may be implemented in software or as a combination of hardware and software. In that case, the software portion of a BIAS module, like the BIAS module 72 in FIG. 3, may be a part of the memory 184 of the computing device 180 as indicated by the block 197 in FIG. 17. In other embodiments, the BIAS software 197 may be a part of the peripheral storage 192 or may reside in a BIAS module that is implemented as a separate unit of the computing device 180. Generally, the program instructions constituting the BIAS software portion 197 may form a part of the memory unit 184 and/or the peripheral storage 192 for execution by the processor 182. When the processor 182 includes a BIAS hardware portion 196, the BIAS software 197 may be executed by the corresponding BIAS hardware 196 with or without the help of additional processing resources in the processor 182 and/or the Operating System (OS) for the computing device 180.

The computing device 180 may also include one or more communication interfaces as part of its interface unit 186 for exchanging data or other digital content via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet and the like. Communication interfaces in the interface unit 186 can also provide communication with external storage (not shown), such as in a storage array, network attached storage, storage area network, one or more databases, or the like. In particular embodiments, the interface unit 186 may include a plurality of broadband antennas and RF components as indicated by the block 199 in FIG. 17. The antennas in the unit 199 may be similar to the antennas 27-30 in FIG. 2 or the antennas 64, 66, 68, and 70 in FIG. 3. As an example, in the context of the embodiment in FIG. 2, the unit 199 may include the radio modem 43 and the RF unit 34.

The computer storage media, such as the memory 184 and the mass storage devices in the peripheral storage 192, may be used to store software and data. For example, the computer storage media may be used to store the operating system (OS) for the computing device 180, various device drivers for the device 180, and the data such as audio content, video content, text data, streaming content, or any other type of content. The computer storage media also may store software applications such as a word processing application, a spreadsheet application, and the like. The program code for the software applications and the OS may be executed by the processor 182. In one embodiment, a non-transitory, computer-readable data storage medium, such as, for example, the system memory 184 or the peripheral data storage unit 192 may store program code or software for a BIAS module as per particular embodiments of the present disclosure. In the embodiment of FIG. 17, the system memory 184 is shown to include such program code as BIAS software 197. In some embodiments, the BIAS software 197 may operate in conjunction with the host OS. The processor 182 may be configured to execute the program code for the BIAS software 197, whereby the computing device 180 may be operative to perform various BIAS-related tasks as per the teachings of the present disclosure. In one embodiment, such tasks may include, for example, the process steps illustrated in FIGS. 5, 7, and 15. The program code for the BIAS software 197 may be proprietary software or open source software which, upon execution by the processor 182, may enable the computing device 180 to perform operations to provide the BIAS functionality as per teachings of the present disclosure.

In particular embodiments, the computing device 180 may include an on-board power supply unit 200 to provide electrical power to various system components illustrated in FIG. 17. The power supply unit 200 may receive batteries or may be connectable to an AC electrical power outlet. In one embodiment, the power supply unit 200 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
    detecting, by a computing device, a wireless mode of operation of the computing device;
    determining, by the computing device, an antenna-specific first operating configuration for each of a plurality of antennas in the computing device, wherein each antenna is a broadband antenna operable to wirelessly transmit and receive over a plurality of Radio Frequency (RF) ranges;
    for each of the plurality of antennas, monitoring, by the computing device, a plurality of triggers capable of affecting signal quality of the antenna in the antenna-specific first operating configuration;
    based on the plurality of triggers, selecting, by the computing device, an operating configuration of at least one of the plurality of antennas;
    dividing the plurality of antennas into a first subset of antennas and a second subset of antennas, wherein the first subset of antennas and the second subset of antennas are mutually exclusive; and
    operating each antenna in the first subset of antennas in a first pre-determined operating configuration; and
    operating each antenna in the second subset of antennas in a particular configurations that is different from the first pre-determined operating configuration, the particular configuration comprising one of:
        a second pre-determined operating configuration; or
        a third pre-determined operating configuration that is different from the second pre-determined operating configuration.

2. The method of claim 1, wherein the wireless mode of operation comprises one or more of the following:
    a cellular communication mode;
    a Wireless Fidelity (Wi-Fi®) communication mode;
    a ZigBee® communication mode;
    a Bluetooth® communication mode;
    a Near Field Communication (NFC) mode; and
    a Machine-to-Machine (M2M) communication mode.

3. The method of claim 1, wherein detecting the wireless mode of operation comprises:
    receiving a mode selection input from a user of the computing device selecting the wireless mode of operation; and
    processing the mode selection input to identify the wireless mode of operation.

4. The method of claim 1, wherein the method further comprises:
    placing each of the plurality of antennas in a pre-defined default operating configuration prior to detecting the wireless mode of operation.

5. The method of claim 1, wherein the plurality of triggers comprises two or more of the following:
    a change in orientation of the computing device;
    a proximity of a human body part to the computing device;
    a source of electrical noise;
    an operational status of each display unit in a plurality of display units comprised in the computing device;

a proximity of the human body part that is unacceptable under a wireless mode-specific Specific Absorption Rate (SAR) requirement;
a change in a SAR-based pre-defined location of the computing device; and
an Over-The-Air (OTA) signal for the wireless mode of operation.

6. The method of claim 1, further comprising:
activating a corresponding antenna to perform wireless transmissions/receptions in the first pre-determined operating configuration;
placing a corresponding antenna in an idle mode to prevent the antenna from performing wireless transmissions/receptions in the second pre-determined operating configuration; and
turning off a corresponding antenna in the third pre-determined operating configuration.

7. The method of claim 1, wherein:
the plurality of antennas comprises a first antenna, a second antenna, a third antenna, and a fourth antenna;
the first subset of antennas comprises the first antenna and the second antenna; and
the second subset of antennas comprises the third and the fourth antennas.

8. The method of claim 7, wherein the first pre-determined operating configuration comprises:
configuring the first antenna to operate as a main antenna; and
configuring the second antenna to operate as an auxiliary.

9. The method of claim 1, further comprising:
switching an operating configuration of at least one antenna in the first subset of antennas from the first pre-determined operating configuration to one of:
the second pre-determined operating configuration; or
the third pre-determined operating configuration.

10. The method of claim 1, further comprising:
switching an operating configuration of at least one antenna in the second subset of antennas to the first pre-determined operating configuration.

11. The method of claim 1, wherein:
one of the plurality of triggers comprises proximity of a human body part that is unacceptable under a wireless mode-specific Specific Absorption Rate (SAR) threshold; and
selecting the operating configuration of at least one of the plurality of antennas comprises:
determining that transmit power level of the at least one of the plurality of antennas satisfies the wireless mode-specific SAR threshold;
switching the operating configuration of at least one of the plurality of antennas from the antenna-specific first operating configuration to an antenna-specific second operating configuration;
determining that the transmit power level of the at least one of the plurality of antennas in the antenna-specific second operating configuration satisfies the wireless mode-specific SAR threshold; and
adjusting, by the computing device, a duty cycle of at least one of the plurality of antennas between a first duty cycle associated with the antenna-specific first operating configuration and a second duty cycle associated with the antenna-specific second operating configuration.

12. A computer program product comprising one or more non-transitory media having program code that is executable by a computing device to perform operations comprising:
detecting a wireless mode of operation of the computing device;
establishing an antenna-specific first operating configuration for each of a plurality of antennas in the computing device, wherein each antenna is a broadband antenna operable to wirelessly transmit and receive over a plurality of Radio Frequency (RF) ranges;
for each of the plurality of antennas, monitoring a plurality of triggers that are capable of affecting signal quality of the antenna in the antenna-specific first operating configuration;
based on the plurality of triggers, selecting an operating configuration of at least one of the plurality of antennas;
dividing the plurality of antennas into a first subset of antennas and a second subset of antennas, wherein the first subset of antennas and the second subset of antennas are mutually exclusive;
operating each antenna in the first subset of antennas in a first pre-determined operating configuration; and
operating each antenna in the second subset of antennas in a particular operating configuration that is different from the first pre-determined operating configuration, the particular operating configuration comprising one of:
a second pre-determined operating configuration; or
a third pre-determined operating configuration that is different from the second pre-determined operating configuration.

13. The computer program product of claim 12, wherein the operations further comprise:
switching an operating configuration of at least one antenna in the first subset of antennas from the first pre-determined operating configuration to one of the following operating configurations:
the second pre-determined operating configuration, or
the third pre-determined operating configuration.

14. The computer program product of claim 12, wherein one of the plurality of triggers comprises proximity of a human body part that is unacceptable under a wireless mode-specific Specific Absorption Rate (SAR) threshold, and wherein the operations further comprise:
determining that transmit power level of the at least one of the plurality of antennas satisfies the wireless mode-specific SAR threshold;
switching the operating configuration of at least one of the plurality of antennas from the antenna-specific first operating configuration to an antenna-specific second operating configuration;
further determining that the transmit power level of the at least one of the plurality of antennas in the antenna-specific second operating configuration satisfies the wireless mode-specific SAR threshold; and
adjusting a duty cycle of the at least one of the plurality of antennas between a first duty cycle associated with the antenna-specific first operating configuration and a second duty cycle associated with the antenna-specific second operating configuration.

15. The computer program product of claim 12, wherein the wireless mode of operation comprises one or more of the following:
a cellular communication mode;
a Wireless Fidelity (Wi-Fi®) communication mode;
a ZigBee® communication mode;
a Bluetooth® communication mode;
a Near Field Communication (NFC) mode; and
a Machine-to-Machine (M2M) communication mode.

16. A computing device comprising:
one or more processors; and
one or more non-transitory computer-readable media including instructions that are executable by the one or more processors to perform operations comprising:
- detecting a wireless mode of operation of the computing device;
- establishing an antenna-specific first operating configuration for each of a plurality of antennas in the computing device, wherein each antenna is a broadband antenna operable to wirelessly transmit and receive over a plurality of Radio Frequency (RF) ranges;
- for each of the plurality of antennas, monitoring a plurality of triggers capable of affecting signal quality of the antenna in the antenna-specific first operating configuration;
- based on the plurality of triggers, selecting an operating configuration of at least one of the plurality of antennas;
- dividing the plurality of antennas into a first subset of antennas and a second subset of antennas, wherein the first subset of antennas and the second subset of antennas are mutually exclusive;
- operating each antenna in the first subset of antennas in a first pre-determined operating configuration; and
- operating each antenna in the second subset of antennas in a particular operating configuration that is different from the first pre-determined operating configuration, the particular operating configuration comprising one of:
  - a second pre-determined operating configuration; or
  - a third pre-determined operating configuration that is different from the second pre-determined operating configuration.

17. The computing device of claim 16, wherein the operations further comprise:
switching an operating configuration of at least one antenna in the first subset of antennas from the first pre-determined operating configuration to one of the following operating configurations:
the second pre-determined operating configuration, or
the third pre-determined operating configuration.

18. The computing device of claim 16, wherein one of the plurality of triggers comprises proximity of a human body part that exceeds a wireless mode-specific Specific Absorption Rate (SAR) threshold.

19. The computing device of claim 18, wherein the operations further comprise:
- determining that a transmit power level of the at least one of the plurality of antennas satisfies the wireless mode-specific SAR threshold;
- switching the operating configuration of at least one of the plurality of antennas from the antenna-specific first operating configuration to an antenna-specific second operating configuration;
- further determining that the transmit power level of the at least one of the plurality of antennas in the antenna-specific second operating configuration satisfies the wireless mode-specific SAR threshold; and
- adjusting a duty cycle of the at least one of the plurality of antennas between a first duty cycle associated with the antenna-specific first operating configuration and a second duty cycle associated with the antenna-specific second operating configuration.

20. The computing device of claim 16, wherein the wireless mode of operation comprises one or more of the following:
a cellular communication mode;
a Wireless Fidelity (Wi-Fi®) communication mode;
a ZigBee® communication mode;
a Bluetooth® communication mode;
a Near Field Communication (NFC) mode; and
a Machine-to-Machine (M2M) communication mode.

* * * * *